United States Patent [19]
Benjamin

[11] Patent Number: 5,354,404
[45] Date of Patent: Oct. 11, 1994

[54] CONTROL FOR INTEGRATED TIRE BUILDING SYSTEM

[75] Inventor: Gary H. Benjamin, Kenton, Ohio

[73] Assignee: Cooper Tire & Rubber Company, Findlay, Ohio

[21] Appl. No.: 529,097

[22] Filed: May 25, 1990

[51] Int. Cl.⁵ .............................................. B29D 30/20
[52] U.S. Cl. .................... 156/362; 156/123; 156/133; 156/405.1
[58] Field of Search ............... 156/123, 132, 133, 362, 156/405.1

[56] References Cited

U.S. PATENT DOCUMENTS

| | | | |
|---|---|---|---|
| 3,112,237 | 11/1963 | Borglin et al. | 156/403 |
| 3,789,712 | 2/1974 | Enders | 83/171 |
| 3,853,653 | 12/1974 | Olbert et al. | 156/133 |
| 4,314,864 | 2/1982 | Loeffler et al. | 156/132 |
| 4,359,675 | 11/1982 | Miller, III | 318/603 |
| 4,877,468 | 10/1989 | Siegenthaler | 156/111 |

*Primary Examiner*—Michael W. Ball
*Assistant Examiner*—Francis J. Lorin
*Attorney, Agent, or Firm*—Joseph G. Nauman

[57] ABSTRACT

The principal object of the invention is to provide a novel system for assembling green tires according to the two-stage process, together with a programmable control which allows the system to perform most of its functions automatically. The system assembles a first stage tire carcass essentially automatically, then removes and transfers completed carcasses automatically to a unique tire assembly drum, onto which the carcasses are automatically loaded. The assembly drum then acts to form each carcass into the desired toroidal shape. Second stage belt-tread stock assemblies are, in the meantime, completed and then automatically transferred into position surrounding the shaped carcasses, joined thereto, and the joined first and second stage assemblies are stitched together forming a green tire. The completed green tires are then taken automatically from the tire assembly drum and launched onto a unique discharge chute device.

10 Claims, 14 Drawing Sheets

CONTROL FOR INTEGRATED TIRE BUILDING SYSTEM

BACKGROUND OF THE INVENTION

This invention relates to a system for assembly of radial tires and to methods and apparatus incorporated in such system.

The basic elements of modern radial ply pneumatic tires consist of an innerliner, one or more radial plies, sidewalls, beads and fillers, etc., all combined to form a carcass, and one or more belts made of steel cord or other cord materials combined with tread stock material to form a belt-tread stock assembly. These two assemblies are then combined to form a green tire, which is subsequently vulcanized in a mold.

U.S. Pat. No. 4,402,782 issued Sep. 6, 1983 to the assignee of this application, describes a method and apparatus for constructing such radial ply pneumatic tires by producing major assemblies on two distinct and separate types of apparatus, and combining those assemblies into a green tire, which is then vulcanized in a mold.

The first assembly, referred to herein as the "first stage carcass" consists of an innerliner plus one or more body plies of rubber coated cord material, a pair of axially spaced parallel bead assemblies encompassed by layers of ply material, and side wall stock material, all of which when combined comprise a first stage assembly. These tire elements are assembled and consolidated on a cylindrical carcass building drum such that the body plies (in the case of a radial tire) have ply cords essentially parallel to the rotational axis of the building drum as the carcass is assembled thereon, e.g. extending along the cylindrical carcass. The two bead assemblies (hereinafter referred to as "beads") are anchored to the opposing axial extremities of the first stage carcass, for example by folding part of the plies inward around the respective beads, the beads being parallel one to the other and coaxial with the rotational axis of the carcass, and two layers of sidewall stock are circumferentially consolidated to the outer surface of the carcass, axially disposed one from the other and each adjacent to one of the beads. Upon completion the carcass is transformed from its cylindrical shape to that of a toroid so the radial body cords are made to assume the configuration of meridians to the rotational axis of the carcass.

The second assembly is prepared by consolidating one or more relatively nonextensible belts, of suitable cord (e.g. steel wire in the case of a steel belted tire) incorporated into uncured rubber stock, with a band of tread stock. Then the belt/tread stock assembly is consolidated with the toroidal carcass, producing a finished green radial tire carcass which is removed from the building machine and placed in a suitable mold for final shaping and vulcanization of the various rubber components, thereby forming a completed cured tire.

Conversion of the cylindrical first stage cylindrical carcass assembly to toroidal shape, and attaching the belt/tread stock assembly thereon, has been achieved in a variety of ways.

The more conventional steps are:

(1) Assembly of the first stage carcass components on a holding drum that is capable of causing the consolidated cylindrically shaped first stage carcass to be transformed into a toroidal shape and then completion of the green radial tire carcass by attaching equatorially thereon the belt and tread stock elements; this is usually referred to as the single stage process of green tire assembly; or (2) Assembly of the first stage carcass on a conventional collapsible building drum that is incapable of transforming a cylindrical carcass to toroidal shape, and, upon completion of that cylindrical assembly, transferring same to a different drum or holding means whereby said first stage carcass is held and manipulated during its transformation to toroidal shape and the assembly of belts and tread stock thereon; this is generally referred to as the two stage process.

Present construction processes also include the alternatives of either assembling and consolidating the belts and tread stock directly on the toroidal first stage carcass, or assembling and consolidating the belts and tread stock on a separate drum and then conveying that belt-tread subassembly to a coaxial position with the toroidal shaped first stage carcass, whereupon such toroidal first stage carcass is caused to be further expanded into circumferential contact and consolidation with the inner surface of the belt-tread stock assembly.

Both of these systems, however, have a number of disadvantages. The single stage system is slow and inflexible; it suffers from down time when process components are unavailable; specification changeover is time consuming since many different equipment elements must be exchanged and/or adjusted; single stage equipment requires much expensive tooling; such systems require highly skilled and well trained operators; such systems are expensive, not very productive and they are therefore not widely used.

The two-stage process requires two distinct types of assembly equipment; (a) a carcass building machine, and (b) a second stage assembly machine. As the industry has moved from 4-ply, bias construction to radial tire construction, the old bias machines were kept and are being used as carcass builders. These machines were usually designed in the late 1950's and 1960's and they lack the precision and alignment characteristics required to allow the assembly of a precision first stage carcass. Having had the ability to build a carcass, emphasis was placed by the industry and equipment suppliers on developing second stage machinery, and there are a number of systems being used, while the development of a precision carcass assembly system has been neglected. Since carcass building requires the assembly of all of the basic components going into a radial tire except for belts and tread stock or extrusion, it takes a greater amount of time to assemble a carcass than the second stage of the radial tire. Thus, a difference in building rates exists which is difficult to overcome through scheduling schemes.

Depending on the speed of the first and second stage machines being used, as well as the different tire constructions being assembled, the ratios of carcass to second stage building often vary between two first stage machines to one second stage machine which ratio increases, in some cases, even up to 3 to 1, making it additionally difficult to plan for capacity increases.

Because of the uneven productive output of these assembly systems, in-process carcasses that are waiting to be second staged must be handled, stored and carted to second stage assembly machines which are usually located in other areas of a plant. Such handling and storage is costly due to additional labor and large amount of floor space requirements but, above all, the handling and storage adds many uncontrollable and undesirable process variables to the product. Examples are additional touching by human hands and the associated exposure to hand perspiration, dirt or greases on hands and fingers, remnants from soaps, hand wash detergents or skin creams which may be present; the exposure to airborne particles which deposit themselves on the outer surfaces of the carcass; and the unknown duration of that exposure which may be as low as one hour but which could be as long as three and four days on long weekends. Along with that exposure variable goes the fact that a surface cure will take place often due to high ambient temperatures in storage areas. All of this affects the adhesion of the green, in-process product and the final bonding being achieved by curing the tire in a mold.

Conventional carcass building machines consist of a stationary tire assembly machine and a multi-station component storage and delivery services. These machines are designed to accept a collapsible drum on which components are placed in a sequential order. These components are extracted from the different servicer positions by the operator, touched by his hands and fingers, while the pulling motion may not be uniform thus often causing noticeable cord distortions and component dislocations. Such extracted components are then cut to length by the operator using a conventional hot knife, and these manually cut components are loosely guided onto the assembly drum through the means of mechanical edge guiders. This method of component assembly is not very precise but is, above all, labor intensive and operator dependent in terms of his skills and willingness to do a good job. Cut tire analysis will confirm that builder produced splices are often one cord overlap in one area while being 5 or 6 cord overlap elsewhere.

The quality of the completed radial ply tire requires that dimensionally accurate components are precisely assembled and such precision of dimension and assembly be maintained throughout the balance of the tire manufacturing process.

State of the art second stage radial tire building machines generally consist of a bed having mounted at opposite ends thereof, spaced apart and axially aligned, a first shaft supporting a rotatable collapsible belt building drum and a second shaft supporting a rotatable tire building drum which receives a first stage carcass. On that drum a carcass is transformed from cylindrical to toroidal shape, united with a belt-tread stock assembly formed on the belt building drum and then rotated about its axis while final consolidation is accomplished by stitching.

SUMMARY OF THE INVENTION

The present invention provides specifically an integrated tire assembly system including a method and apparatus for building a complete green tire by a two-stage method on a single machine, and specifically a control for such an integrated assembly system. The machine may be monitored by a single person, and it automatically assembles a first stage carcass on a carcass building drum from supplies of ply material and sidewall stock, receives and inserts bead rings from placer mechanisms and incorporates those beads into the carcass, stitches the first stage carcass, then transfers that carcass to a tire building drum on which the carcass is modified to toroidal shape. During part of this interval the belt-tread stock assembly is built by the operator on a belt building drum, and then the belt-tread stock assembly is transferred into position around the shaped carcass after which the two assemblies are consolidated on the tire building drum, and the completed green tire is then automatically unloaded from the system.

The integrated building system includes a number of novel mechanisms or devices, including a first stage having a novel carcass building drum cooperating with automatic ply servers, sidewall stock servers, and bead assembly receivers and placers. The system also has in its second stage a novel tire building drum which includes mechanisms for receiving and expanding/reshaping the carcasses from the first stage, a novel belt/tread building drum, a modified and cooperating transfer ring and associated mechanism to carry a belt-tread stock assembly from the belt/tread building drum to the tire building drum, and a green tire unloading system consisting of an unloader and a take-away mechanism. A novel transfer robot removes the completed carcass from the first stage or carcass building drum, and carries the first stage carcass to the tire building drum of the second stage machine. The overall system and a number of these devices are the subject of separate co-pending patent applications, the principal disclosure of the overall system being in copending U.S. patent application Ser. No. 529,080 filed on even date herewith and assigned to the same assignee.

The various servers, particularly the ply and belt servers, are arranged so they may be optionally utilized for varying the type and size of tire which can be constructed on this integrated system. In the carcass building section of the system, in addition to the ability to build different types of tires to different specifications, with quick and easy change, the carcass building drum is supported on and operates from a movable carriage which may be driven to skip certain ones of the ply servers, according to a given specification. The carriage also cooperates in a unique manner with the ply servers to align the carcass building drum into conformity with the center of a ply ready in the server. This allows a simpler ply serving mechanism to provide high accuracy of ply placement.

The first stage carcass building section is automated such that, except for placement of bead members in a ready position, the system operator is free to devote his time and attention to the belt-tread assembly and the final assembly of the green tire.

The system provides for rapid change and/or replenishment of the tire building elements handled by and used in the servers, such as ply material, side wall stock, belts and tread stock. In the case of high capacity ply materials, these are brought to the system in preloaded cartridges which are then accurately moved into engagement with the drive-out system of the ply server mechanism, and on which the carrier webs for the ply material can be rewound or gathered for subsequent replenishment with new webs of ply material.

An important feature of the system is the manner in which the carcass building drum is aligned with the ply materials on the application conveyors of the various ply servers. This is accomplished by determining the centerline of the ply material web, then moving the carriage to bring the transverse center plane of that drum into alignment with that centerline.

Two slightly different techniques have been evolved for this purpose. The preferred technique uses a web supply method and apparatus with an active guiding system controlling web ply material fed accurately into the application conveyor relative to its centerline. In another technique, the ply material web is automatically unloaded from the cartridge and approximately centered on the server application conveyor. The web is then scanned when such conveyor pulls it forward, and dividing the distance between edges of the ply material determines it centerline. The carriage and the carcass building drum thereon are then positioned accurately on the centerline of the ply material, as by digital servomechanisms.

The ply servers also operate, under programmable control, to cut a predetermined length of the ply material from the supply roll led into the server mechanism from the supply cartridge. Thus, by keyboard changes of programs it is possible to build different sizes of tires, with different numbers of plies, in different lengths, in an essentially fully automatic process.

A side wall strip server functions, under programmable control, to let out length of sidewall material of desired length, and deliver them into proximity to a station along the carriage path, where these strips may be added to the material already gathered on the carcass building drum. The, preferably at this same station, the ply material, beads, and side wall strips are finally stitched and consolidated into a completed first stage carcass.

The transfer operation, in which a first stage carcass is moved to the tire building drum of the second stage machine is accomplished with a series of simple linear and arcuate motions by a robotic transfer device which can be precisely controlled with a high degree of repeatability. When the first stage carcass is completed, the carcass building drum is located at that time opposite the gripper arms of the transfer robot, which is in its ready position. When initiating the carcass unloading-/carcass transfer operation those arms are first extended and then brought into active engagement with the carcass in its bead area at several contact points, thereby holding the carcass firmly in its completed position. The carcass building drum is collapsed radially inward, and the headstock and tailstock parts of the carriage then move to separate by a distance slightly greater than the length of the first stage carcass. The carriage moves the drum out of the carcass which remains being held by its beads by the transfer robot. Then, the robot mechanism simply swings the carcass, engaged by the gripper arms, through an arc of about 180 degrees, precisely into general alignment with the rotational axis of the tire building drum of the second stage assembly machine. The robot arms then move parallel to the tire building drum until the carcass is sufficiently around that drum, whereupon the carcass is released from the gripper arms, which then are opened and retracted away from the carcass, and the mechanism of the transfer robot retreats to its inactive or ready position.

During side wall stitching the operator may position one bead on the inboard bead placer and after removal of the carcass by the robotic transfer device, the operator may place the second bead on the outboard bead placer. Both placers are pivotally mounted to the carriage on a sliding support structure and, in their inactive position, are swung out toward the operator side of the slidable carcass building drum carriage. These placers can be rotated about an axis parallel to the carcass drum axis, between the off-side location and a location coaxial with the carcass building drum. Thus, new bead rings are positioned on the bead holders in the carcass building section of the system as the carriage proceeds back to the first ply server, to commence building another carcass.

The tire building drum of the second stage machine is of a flangeless design which departs dramatically from conventional drums because of its unique mode of operation. It has the same transversely divided structure, with two generally cylindrical halves which are can be moved toward and away from each other, as illustrated in said U.S. Pat. No. 4,402,782. The starting position of the two drum halves has them separated such that each will receive one end (bead region) of the first stage carcass at the end of the above described transfer operation.

After the release of the carcass by the robotic grippers, radially expansible pads on each of the drum halves are extended to engage the interior surface of the carcass. The drum halves are then moved axially apart until the respective sets of the extended pads engage both beads, thereby self-centering the carcass on the tire building drum automatically and in a very precise manner. In that position both carcass beads are located circumferentially around a pair of radially expansible sealing rings, one on each drum half and these sealing rings are expanded against the interior of the beads to seal the first stage carcass to the tire building drum.

The interior of the carcass, and the space between the two drum halves, may then be pressurized, and as the air pressure increases, the drum halves can be moved together until the beads are located a predetermined distance apart. Through this action, the first stage carcass can be automatically transformed from a cylinder into the desired toroidal shape, without operator assistance.

In the meantime, the belt-tread stock assembly is built on a novel, programmably adjustable building drum, and the completed assembly is then carried by a transfer ring mechanism into position coaxially surrounding the shaped carcass. The carcass is further inflated to bring it into contact with the interior of the belt-tread stock assembly, and with the transfer ring withdrawn, the two assemblies are stitched together, completing the construction of a green tire. The majority of the foregoing work is performed with minimum operator attention or help; in actual practice one operator can readily attend to the normal operating of the system.

Finally, the completed green tire is automatically released from the tire assembly drum and transported by automated holders to a discharge station, where a discharge chute is positioned beneath the green tire. The holders are arranged so they engage the periphery of the green tire at diametrically opposite points, which are on a line rotated somewhat from vertical. Thus as these arms release the green tire, it rolls by gravity onto the discharge chute mechanism, and passes to a discharge conveying system which can take the complete green tires to a vulcanizing and molding operation.

The principal object of the invention is to provide a novel control system for assembling green tires according to the two-stage process; to provide such a control which causes a tire carcass to be assembled essentially automatically; to provide such a control for causing the removal and transfer of completed carcasses automatically to a unique assembly drum, onto which the carcasses are automatically loaded, and which then acts to form each carcass into the desired toroidal shape; to provide such a system control wherein completed belt-tread stock assemblies are automatically transferred into position surrounding the shaped carcasses, and then joined thereto; and to provide such a system wherein the completed green tires are taken automatically from the tire assembly drum and launched onto a unique discharge chute device.

Other objects and advantages of the invention will be apparent from the following description, the accompanying drawings and the appended claims.

GENERAL MACHINE DESCRIPTION

The present invention relates to a novel, microprocessor-based radial passenger tire assembly system capable of yielding high quality products consistently at high rates of speed, and specifically to the programmable control for that apparatus. The system consists of a first stage carcass builder with novel servicing means, a robotic device for the transfer of first stage (formed but not finally shaped) carcasses, a second stage machine for making a belt-tread stock assembly and combining it with a carcass from the first stage, and an automatic green tire unloading mechanism.

Special features include automatic liner, body ply and side wall driveout component length determination, automatic length cutting and the automatic application of many major components to the carcass, belt and tread, and final assembly drums. The first stage apparatus further includes automated ply-down, bead set and bead lock through bladder turn-up means. All length-cutting operations are automatic using ultrasonic knife actions. Beads are placed automatically onto bead setters at the carcass drum, by unique bead placers.

Additionally, the system uses a number of sensors which are capable of signaling off-spec conditions such as over or under width innerliner or ply stock dimensions, and sensors also confirm the presence of beads or alert the absence of same.

The carcass drum itself is conventional, but it incorporates novel rotatable and inflatable bladders for supporting ends of ply material extending beyond the drum surface, and for turning ply ends around the beads. The belt/tread drum is a novel design which embodies the ability to be adjusted for specification changes through remote keyboard programming.

Component servicers use cartridge-type material holding and drive out means to minimize the time required to make supply changes, either for additional supply or for specification changes.

The tire assembly drum is also a novel design, in that it is flangeless and, thus, does not require button hooking when a tire carcass is being chucked. This permits automated carcass loading as well as automated green tire removal from the assembly system.

General Layout

Figure 1:
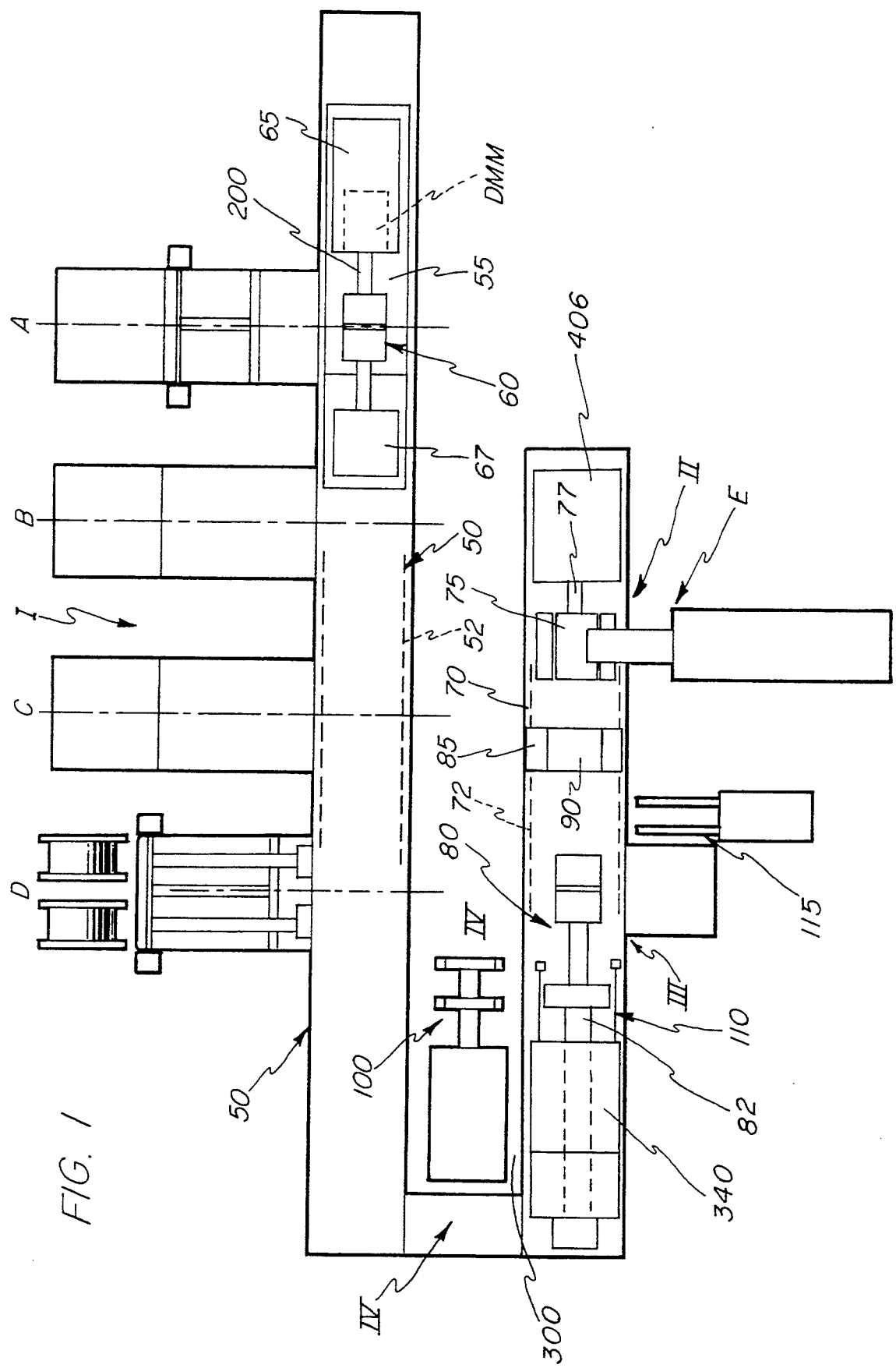
FIG. 1 is a diagrammatic plan view of the complete integrated two stage tire building system.

FIG. 1 is a floor plan of the system which includes on one side a novel carcass building section I, on the other side a belt and treadstock building section II together with the green tire building section III, and between sections I and IIIa carcass carrying and transfer section IV, which unloads a completed carcass from section I and places it in the tire building section III. The carcass building section I includes a bed 50 having a track or way 52 for a carriage 55 that supports a carcass building drum 60 and its associated headstock 65 and tailstock 67, along with bead ring placers 70 (FIG. 1) for this building drum 60. Track 52 defines a carcass building path and along the track is a plurality of stations A, B, C, and D which function as innerliner, ply and sidewall servers. It should be understood that additional ply servers may be added, as between stations C and D.

In operation, carriage 55 is moved under program control into alignment with the center of ply material or sidewall material at the various stations. Circular beads or hoops 36, combined with a filler 36, are set on bead placers which are associated with drum 60, and predetermined lengths of ply materials are likewise placed on and assembled around the drum, all in a desired sequence, and the edges of at least some plies are turned over the beads, producing a completed tire carcass TC, hereinafter referred to as the first stage carcass assembly.

Sections II and III preferably are supported on a common second bed 70 having another track or way 72 extending in spaced relation to the first track 52, preferably parallel thereto. At one end of the second track 72 there is a belt/tread stock building drum 75 (sometimes called a belt building drum), supported on a rotatable shaft 77 with its axis of rotation extending parallel to second track 72. Adjacent the belt building drum there is a belt server E which can supply one or more belt components to the belt building drum 75, and a tread stock server (below server E) which can supply a length of tread stock to the belt building drum. At the other end of second track 72 there is a flangeless tire building or assembly drum 80, comprising two drum halves rotatably supported on a second shaft 82 with its axis parallel to track 72 and precisely in line with the axis of belt building drum 75. A carriage 85 is supported for movement between the drums 75 and 80 along track 72, and on carriage 85 is a transfer ring 90 which can engage and remove a completed belt/tread stock assembly from belt building drum 75 and move such assembly over and around a carcass which has been placed on tire building drum 80, to be manipulated into a toroidal shape.

Between the two tracks 52 and 72, the transfer section IV includes a carcass transfer robot 100 which functions to remove a first stage tire carcass from carcass building drum 60 and position carcass onto the tire building drum 80, where the carcass is transformed into the desired toroidal shape, as part of the application of a belt/tread stock assembly to that carcass. The two assemblies are then stitched together to produce a green tire. Once the green tire is completed, an unloading mechanism 110 associated with the tire building drum engages the tire, then moves the tire to a discharge chute assembly 115 and releases the tire, from whence the tire is taken to a vulcanizing press for final curing.

First Stage Ply Servers

Figure 4:
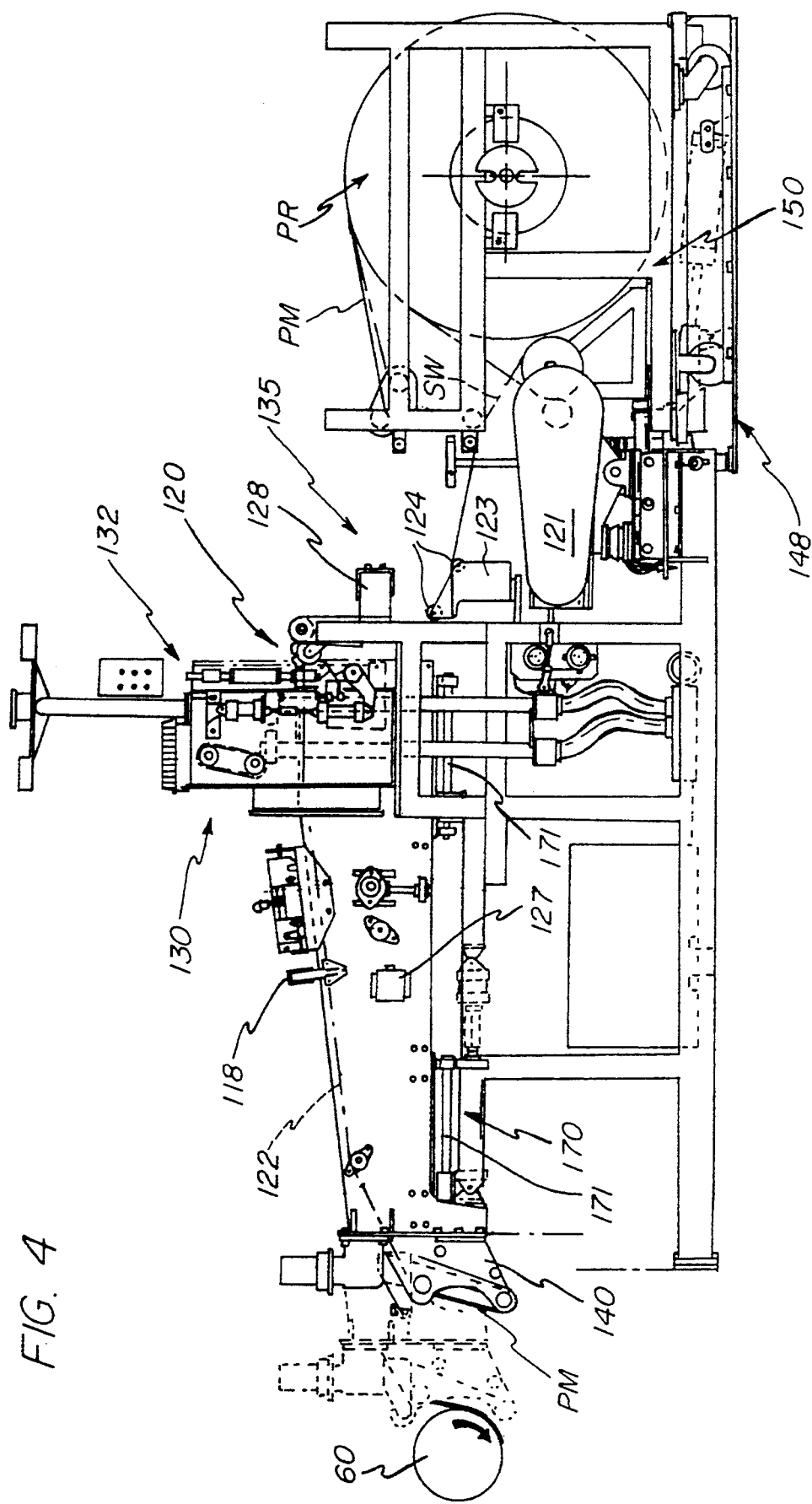
FIG. 4 is a schematic view of one of the ply servers of the carcass building or first stage apparatus.

The ply servers A, B, C are unique units designed to apply to the carcass building drum 60 (or onto ply materials having previously been placed on that drum) predetermined lengths of inner liner and ply materials which are supplied from large supply rolls PR (see FIG. 4). The desired length of ply material PM is measured by feeding the material past a detector 118 which is located a known fixed distance along the main feed conveyor 122, by a servomotor, under control of a programmable mechanism which is set to the desired ply length. Once the leading edge of the ply material reaches this detector, it is advanced further by a variable distance corresponding to the programmed ply length. Thus the fixed length plus the variable length equals the programmed total desired ply length. The web of material PM is then severed at the length desired by a cut-off mechanism 130. A lateral guiding device acts to maintain the location of the longitudinal centerline of the length of ply material PM on the conveyor 122, whereby a central plane which extends through the carcass building drum 60, transverse to its axis of rotation, can be located on the centerline of the ply material.

When the carriage 55, and the carcass building drum 60 thereon, are located on this centerline, the ply PM is then fed onto the drum parallel to and upon its rotating surface. Each server has an applicator head 140 for this purpose, arranged to be extended into close proximity to drum 60 at the appropriate time. The carriage drive is programmed to move drum 60 into a location where it is precisely located with respect to the longitudinal centerline of the oncoming ply material PM.

At the opposite end of the server, away from the track and carriage, there is a receptor arrangement 148 into which a cartridge 150 bearing a roll PR of ply material can be docked, thus each server can always be supplied quickly with additional ply material as demanded. Further, the servers can be re-stocked with different types or sizes of ply material to build different types of tires, and to different specifications. By using more or less servers in a particular tire construction job, the machine can build carcass (and tires) having different numbers of plies and/or different types of plies. Thus a linear arrangement of ply and other servers is preferred (but not essential) in the carcass building section I of the system from the standpoint of having adjacent aisle space to manipulate the carts, bringing in fresh supplies of ply material and removing spent supplies for replenishment.

The ply material is, typically, some suitable type of fabric material that has been thoroughly coated with uncured rubber on both sides and for building a radial ply tire, the ply material has cords which are predominantly extending transverse to the length of the material as it is aligned for construction into the tire carcass. It is a feature of this invention to supply this material on relatively large rolls PR into which are interwound a separator web material or fabric, e.g. a carrier web, for purpose of preventing the tacky rubberized cord layers from sticking to itself. The rolls of ply material are loaded into cartridges away from the machine, brought to the machine and docked at the selected ply server station receptors, and the ply material is led into the server mechanism through the feeding and guiding mechanism 120. In so doing, separator web is led onto a take-up roller on the cartridge, so as the ply material is being driven out onto the server, the separator web is re-rolled and stored in the cartridge for future re-use.

During the docking action, a drive 121 at the rear of the server is automatically connected to the takeup roll. The ply stock drive-out is controlled by a typical dancer/loop control (not shown) which signals stop/flow requirements via photo-eye sensors to the motor in drive 121. During drive-out, the carrier web is being wound onto a rewind spool, which action is further aided by a set of edge guiders that control a lateral motion system to assure that the carrier web is wound on the take-up roll in a generally even and cylindrical configuration. In this arrangement, the carrier web never enters the servicer like on other conventional machines, and by remaining essentially a captive member of the supply cartridge it is possible to change supply cartridges quickly and without having to manually rewind carrier webs that were partially or fully unwound, which is a very undesirable task with conventional server machines.

The ply material, after leaving the dancer/loop control enters a guide assembly 123 including a pair of active guide rollers 124 which are steered to center the ply material PM for programmed feeding of the material onto feed-out conveyor 122 through the nip of a pair of feed rolls 120 which are driven by the conveyor bely motor. Steering signal requirements for guide assembly 123 are provided through a quartz crystal controlled LED emitter 127 and a tuned receiver 128, which provide constant information as to the location of the edges of ply material PM moving from the guide assembly to feed rolls 124. The ply material thus enters the feed-out conveyor 122 straight and on center.

The ply material PM is fed into the nip between power driven feed rolls 120, then past a traversing cut-off knife mechanism 133, under a pair of vacuum lift boxes 133 and, and onto the main feed conveyor 122 of the server. Length scanner 118 is mounted over this conveyor, at a fixed distance away from the path of the cut-off knife, as mentioned.

The feed rolls 120 are powered by a servomotor to draw ply material from the loop and feed it past the cut-off mechanism 130 onto the main ply feed conveyor 122 until the leading edge of the ply is sensed by the length scanner 118. The servomotor is then reactivated and drives out an additional length of ply material PM, which additional length is programmably determined by keyboard input at a control terminal. This arrangement permits quick length changes and assures ply length accuracies and repeatability, which the operatordependant, manual cut-off method using a conventional hot knife never could achieve.

Ply length measurement is accomplished by sensing of the leading edge of the out fed ply material. The distance from the sensor back to the path of the knife is a constant=X. If a complete wrap around the building drum equates to X+Y, it is the Y amount that is programed into the central processor which will yield Y amount of additional drive-out and hence fulfill the requirement of a complete wrap around to the drum.

At the end of the drive-out, the vacuum boxes descend, energize and lift the portion of the material under the transverse path of cut-off knife, bringing that portion of the material into the transverse path of the knife mechanism. The lift action of the vacuum along with the inner edge contour design of the vacuum boxes form a transverse ridge of the ply material which imparts additional rigidity to the web against the action of the knife, which is then driven along the ridge to sever the ply material to the prescribed length. Preferably the knife includes an ultrasonic vibrating device. Once this cut is made, the vacuum is released, the length of material is dropped onto the server conveyor, and it is fed forward around the applicator head at the front end of the server, to await the arrival and registration of the carcass building drum 60.

The cartridges are stackable to save manufacturing floor space and they will accept 44 inch diameter stock rolls, 40 inches wide, and 20 inch diameter liner rolls, also 40 inches wide. Engagement with the power drive-out and guide means is automatic while the cartridge is being locked in place.

When carriage 55 comes to rest before the respective servers A, B or C the framework of conveyor 122, which is carried on slide rods 171, is moved forward by suitable pneumatic drive cylinders 170 (FIG. 4) and the applicator head 140 causes the forward end of conveyor belt 122 to conform to the side of drum 60, adhering the material PM to the drum surface (or to a previous component thereon), and the drum 60 is caused to make one 360° rotation, thereby drawing the length of material PM onto the drum 60, as shown in phantom at the left end of FIG. 4.

Bead Supply

Figure 2:
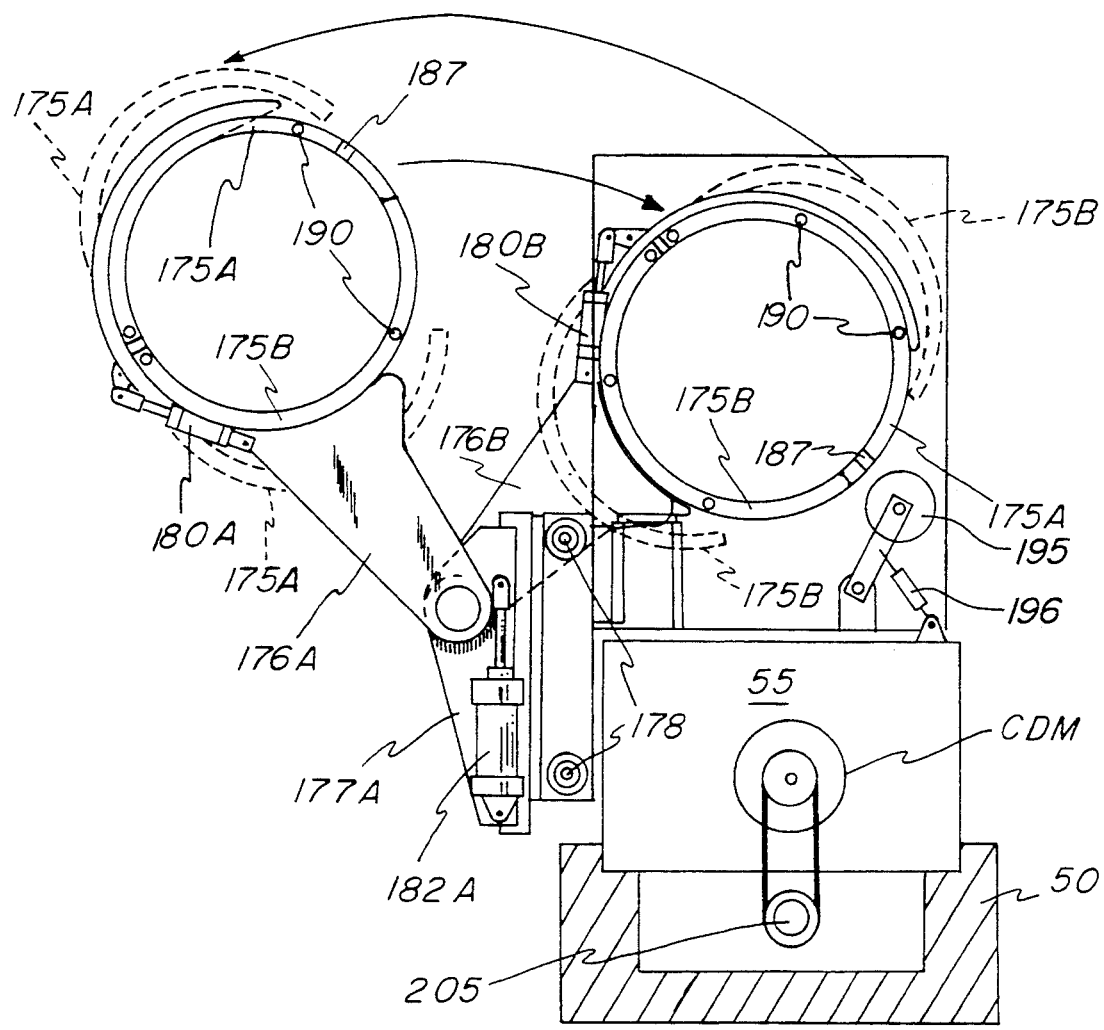
FIG. 2 is a schematic view of the carcass building carriage, drum, and bead placing equipment.

In a preferred arrangement there are two bead placers 70 mounted in spaced relation along the carriage 55 which supports the carcass building drum 60, its supporting headstock 65 with a reversible servomotor drum drive DMM, and the associated tailstock 67. Referring to FIG. 2, the placers are comprised of cooperating half-circular segments 175A and 175B pivotally supported on corresponding swing arms 176A and 176B, located on the opposite side of the drum from the ply servers, and in turn pivotally mounted on horizontally slidable brackets 177A and 177B (not seen). These brackets are mounted to carriage 55 (and its separable section 55A; see below) through guide bars 178, so the entire placer assemblies can be moved longitudinally of the carriage 55. Each of the bead placer's arms can be opened and closed by operation of pneumatic cylinder actuators 180A and 180B, and to illustrate this in FIG. 2 the segments 175A and 175B are shown closed in full lines and are shown open in phantom lines.

It will be clear from the phantom showing of these placers (FIG. 2) that they are individually pivotable as a unit, by their respective arms 176A and 176B, about an axis that is to one side of and parallel to the bed, so as to swing the centerline of the closed segments to a position where such centerline is coaxial with the axis of rotation of the carcass drum, and a retracted loading position where the centerline of the placers is clear of carcass drum 60 and its related drive and control mechanism. This action is produced by individual pneumatic actuator cylinders, one of which 182A is seen in FIG. 2. Summarizing, the bead placers can move parallel to the drum 60, swing toward and away from that drum, and when the bead rings are removed from the segments, they can open and retract outward around and away from drum 60.

Thus, beads or hoops, with an attached filler, are manually set into these two bead placers, then carried into position on the placers, as shown in FIG. 2. When segments 175A and 175B are closed, they present circular shoulders which have a diameter corresponding to the inner diameter of a bead. The placer segments are fitted with a sensor 187, to confirm the presence (or absence) of a loaded bead assembly when the placers are swung to their outer or loading position, and to indicate successful placement (e.g. transfer) of a bead to the bead ring when the arms are positioned around the carcass building drum. The placer segments also are each fitted with a plurality of piston driven ejector pins 190 which are appropriately actuated to move a bead from the placer onto a bead holder (later described) at one end of the carcass building drum 60.

Carcass Building Drum

The carcass building drum 60 is rotatably mounted on the carriage headstock 65 by a suitable rotatably driven shaft 200 (FIG. 1), and during building of the multi-ply carcass, the bead assemblies are moved against an end portion of the ply material, which is then folded back over the bead rings and attached fillers at the appropriate time by mechanism incorporated in the carcass drum. One of the features of the invention is the arrangement whereby the bead rings are loaded into the placers, transferred onto holder rings at opposite ends of drum 60, and the carriage 55 then is moved to align the drum's transverse center plane with the various ply material lengths PM at the servers. Then the innerliner and plies are progressively taken from servers A, B and C, as are side wall stock pieces from server D, and caused to wrap around the carcass building drum 60.

To accomplish this, the drum is circumferentially collapsible and has a programmably controlled drive which starts, stops, and rotates shaft 200 as required to perform these successive building steps. The drum also incorporates an inflatable bladder mechanism which at the appropriate time will fold the ends of certain plies over and around the bead and fillers. Bladder turn-up devices are generally known, however the bladder turn-up mechanism provided with this invention embodies a number of novel features. The bladder assemblies are rotatably mounted on their corresponding support hardware, which in is adapted to be engaged to and driven by the building drum 60 when that drum is being rotated.

As a further feature of this arrangement, bladders are designed and their internal pressure regulation are very precisely controlled so that same maybe only partially inflated to a desired diameter and specific shape so that they will act as drum extensions whereby they are capable of supporting ply materials that are wider than the building drum and which, in that service mode will also act as an anvil that will absorb the pressure of the ply stitch roller which is applied against drum 60 to drive out unwanted trapped air and which also stitches together the leading and trailing ply endings. These features make automated carcass assembly possible.

Mounted on carriage 55, by a pair of spaced apart swinging arms 193, is a stitching or smoothing roller 195 (FIG. 2), preferably rubber covered, which can be moved into and out of contact with the plies and other material added to drum 60, under the control of remotely automatically operated pneumatic cylinders 196. At appropriate times during carcass construction, even while the carriage is moving between stations, drum 60 may be rotated and roller 195 actuated to press the sticky plies of uncured rubber material together and eliminate any air pockets or irregularities which may occur as the plies are "built up" on drum 60.

Carriage 55 carries its drive CDM which in an actual embodiment comprises a digitally driven motor connected to a rotating ball mechanism on a ball screw 205 which runs the length of the bed 50 (see FIG. 1). Thus actuation of the drive causes the carriage to travel along the ball screw 205 and bed 50. The carriage also includes a separable section which carries tailstock 67, and which is normally connected to and travels with the main carriage 55, connected thereto by solenoid actuated shot-pins. When it is necessary to separate drum 60 from the tailstock, to unload a completed carcass, these shot-pins are retracted and the carriage is driven in reverse direction, moving away from the now disconnected section by the length of a pair of trailing arms which are attached to carriage section and to air cylinders on the main carriage 55. This provides a sliding "lost motion" type of connection between the carriage sections, yet provides for returning the section into engagement with the main carriage 55, and re-insertion of the shot pins. The space thus created between drum 60 and tailstock allows unloading movement of a completed carcass.

At the time of such a separation, the carriage is located adjacent server D, as is later described, since a carcass has been completed on drum 60. The placers 70 are swung to the side of carriage 55, with segments 175A and 175B closed together. There, the operator places a bead and filler assembly on each placer, and the sequence illustrated in FIG. 2 is initiated. Placers 70 are moved adjacent each other and align with the gap between drum 60 and tailstock. Next, the placers are swung inward of the carriage, to become coaxial with the drum centerline, then the placers are moved to the bead holders.

During this action, the carriage 55 is moving to the other end of bed 50, adjacent server A. When the carriage reaches that location, the drive CDM is reversed, the main carriage overtakes the now stationary section, and the shot-pins are actuated to rejoin the carriage section to the main carriage 55, as arms are free to move on section 55A for a predetermined distance before engaging and pushing against it. Next, after successful bead transfer is indicated, the placers 70 move toward each other and the segments 175A and 175B are opened, then the segments are swung out around drum 60. Therefore, when the carriage is ready to commence its movements to the various servers, the beads are in position on the holders.

Sidewall Servicer

Figure 5:
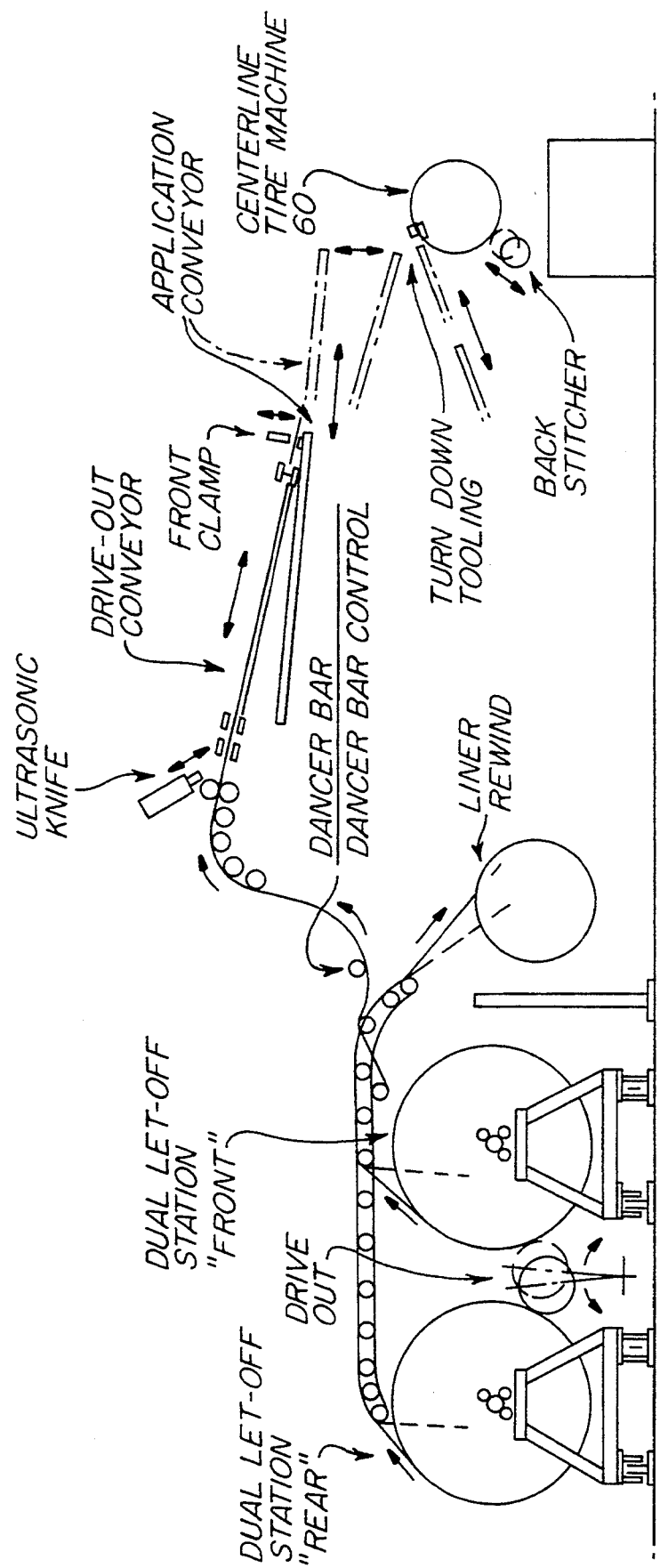
FIG. 5 is a similar schematic view of the side wall strip server.

Sidewall servicing hardware D (FIG. 5) comprises twin double strip let-off stations, complete with power drive-out and liner rewind, and a dancer bar feedout control which maintains a supply of spaced apart side wall strips to the server proper. Supply can be quickly switched via the overhead passive conveyor when one of the let-off drums requires replenishment. The server incorporates a pull-out conveyor with programmable automatic length measurement, by a conveyor motor driving the pull-out conveyor, which has grips engaging the strips, and ultrasonic length cutting.

Both side wall components are delivered skive-cut adjacent to the upper perimeter of building drum 60, and application of the strips to the drum may be builder activated and controlled, or automatic via a transfer mechanism and tilting conveyor tray. Additionally, the servicer frame supports turn-down tooling that is engaged during the final carcass assembly steps, to consolidate and smooth particularly the bead areas of the completed carcass TC.

Transfer Robot

Unlike conventional tire machines, this system features a robotic tire transfer device for unloading carcasses from the first stage carcass builder, and for transferring them onto the tire assembly drum which is except for unloading, the terminus of the second stage operations.

The use of a mechanical transfer eliminates the need for the operator having to remove and handle the carcasses, leaving him free to fulfill other duties. More important, however, the direct transfer of carcasses from the carcass builder to the second stage machine eliminates the need for downstream carcass handling and storage devices. This frees up costly manufacturing space which can now be utilized more productively, the labor requirement for hauling green tire trucks in and out of storage is eliminated, which also simplifies the overall scheduling process, and from a product quality point of view, carcasses are always fresh and not contaminated with dust and airborne particles. Neither are the carcasses ever distorted due to improper storage and they are not subjected to long term temperature and humidity exposures and variations.

Figure 7A:
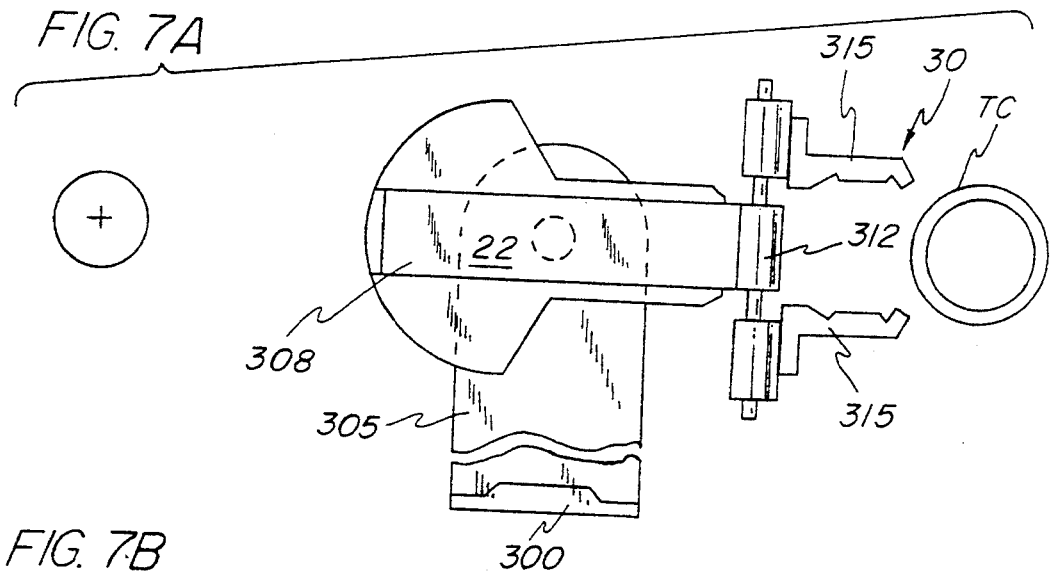
FIGS. 7A, 7B, and 7C are diagrammatic views of the carcass transfer robot which automatically unloads a finished carcass from the first stage apparatus and loads onto the tire assembly drum of the second stage apparatus.
Figure 7B:
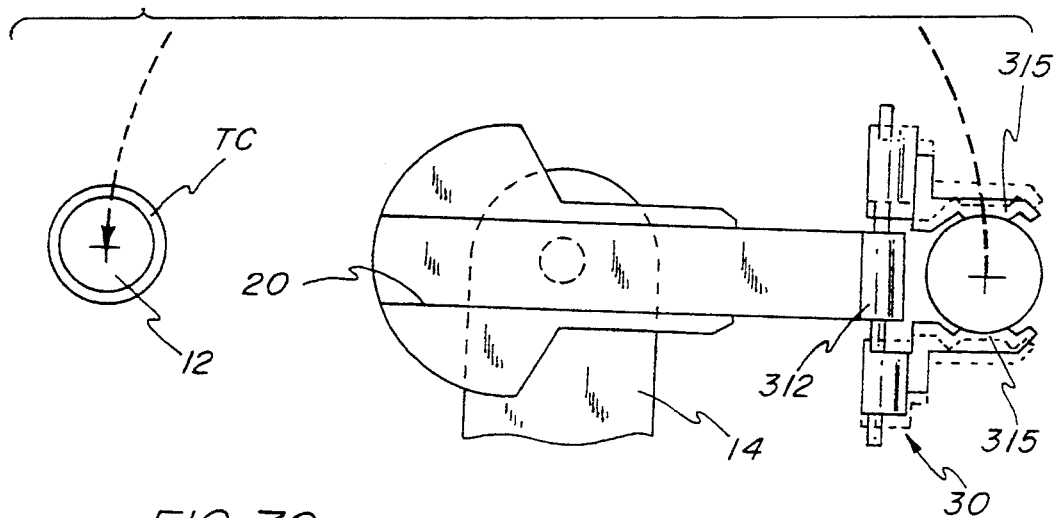
Figure 7C:
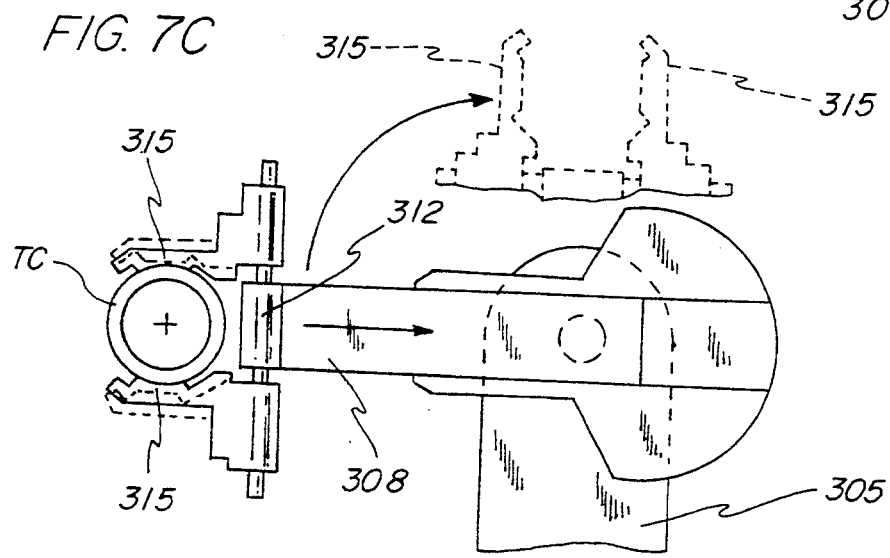

The carcass handler or robot 100 consists of a base or bed 300 (FIGS. 1 and 7A) which is secured in parallel alignment to and between the beds 50 of the carcass builder and 70 of the second stage tire machine. On bed 300 are hardened guide rails or ways, which carry the actual handler structure including carriage and headstock 305 (FIG. 7C) which supports the head of the carcass handler, both rotatably and slidably.

This mechanism includes its own bed 300 and a carriage 305 mounted thereon for movement along bed 300 between a pick-up position, generally opposite server D, and a transfer position away from server D in a direction opposite to the other servers. On carriage 305 there is a rotary mechanism 307, driven by a servomotor or positioner, and which in turn supports an extensible arm mechanism 308 controlled by another servomotor. On the outer end of arm 308 there is mounted a fixture or cradle 310 which carries a first set of slides 312 extending cross-wise of the fixture. Slides 312 in turn carrying a second set of slides extending lengthwise of the fixture. On this second set of slides are brackets which mount a pair of spaced generally C-shaped grip arms 315. Thus, the clamp arms 315 are capable of adjustment motion toward and away from each other under control of a servomotor and appropriate mechanism (not shown), and of gripping/releasing motion lengthwise of the fixture, toward and away from the ends of a carcass under control of a fourth servomotor CAGR.

On arms 315 there are finger members (not shown in detail) spaced apart to fit around the beads of the carcass TC. This allows the arms 315 to engage with and disengage from carcasses of different sizes in both length and diameter, by grasping the beads at diametrically opposite regions, at each end of the carcass. The robotic apparatus is supported on carriage 305 and has straightforward linear motion parallel to the other beds, and rotary movements which enable it to swing the extensible arms 315 and perform this function efficiently without complicated mechanism and/or movement. This contributes to precise, repeatable, transfer motions with long term low maintenance and reliability.

Thus, arms 315 are opened and the head extends these arms to place the fingers around the beads of a carcass on the carriage. The carcass building drum is caused to collapse and the tailstock moves away from the drum, while the arms now support the carcass, lift it upward, and carry it over to align the carcass generally with the axis of tire building drum on the second bed. The robot carriage 305 then moves to carry the carcass concentrically around the tire building drum, and the arms are separated sufficiently to release the carcass onto that drum. After the carcass is placed on the green tire assembly drum, the robot and its arms retreat to a central ready or docked position until the next first stage carcass is finished and green tire assembly drum is cleared for the next operation.

The Second Stage Tire Assembly Machine

The second stage portion of the system is an improved semi-automatic tire assembly machine, generally similar to the type disclosed in U.S. Pat. No. 4,402,782 of Sep. 6, 1983, assigned to the assignee of this application. It features a fabricated base or bed 70 for optimum machine stability, with hardened guideways located in precise alignment to bed 50 of the carcass machine, a novel programmable belt and tread drum 75, a novel flangeless tire assembly drum 80, a precision transfer ring 85 which is driven along the bed, and an automatic tire unloading means 115 (FIG. 1).

The headstock includes the servomotor or positioner which drives the drum 75, and the tailstock is a precision machined non-rotating weldment which supports the assembly drum 80 in cantilever fashion, and houses the drum support/control shaft 82 and its servomotor, the air supply to drum 80, and a pair of unloading arms along with their manipulating means. An unloading track is supported to one side of bed 70 at an unload station beyond the free end of drum 80.

Belt and Tread Drum

The belt and tread assembly drum 75 is a substantial improvement over the adjustable drum disclosed in said U.S. Pat. No. 4,402,782. Drum diameter variations are achievable through linear actions of a draw bar in combination with a cone acting on keyslot supported and guided drum segments. Details are disclosed in said copending U.S. patent application. The draw bar is activated by a servomotor, thus making it possible to manipulate the drum by programmable instructions, to obtain very precise diameter settings through remote input.

Outer drum segments of this novel drum feature quick change mountings, permanent magnets for steel belt attraction, and scalloped edges to minimize gaps between segments thus providing an almost continuous support for the steel belts being placed thereupon. A drum diameter range of 18 inches minimum to 30 inches maximum is obtainable with only four sets of tooling consisting of twelve segments each.

Belt Tread Servicer

Figure 6:
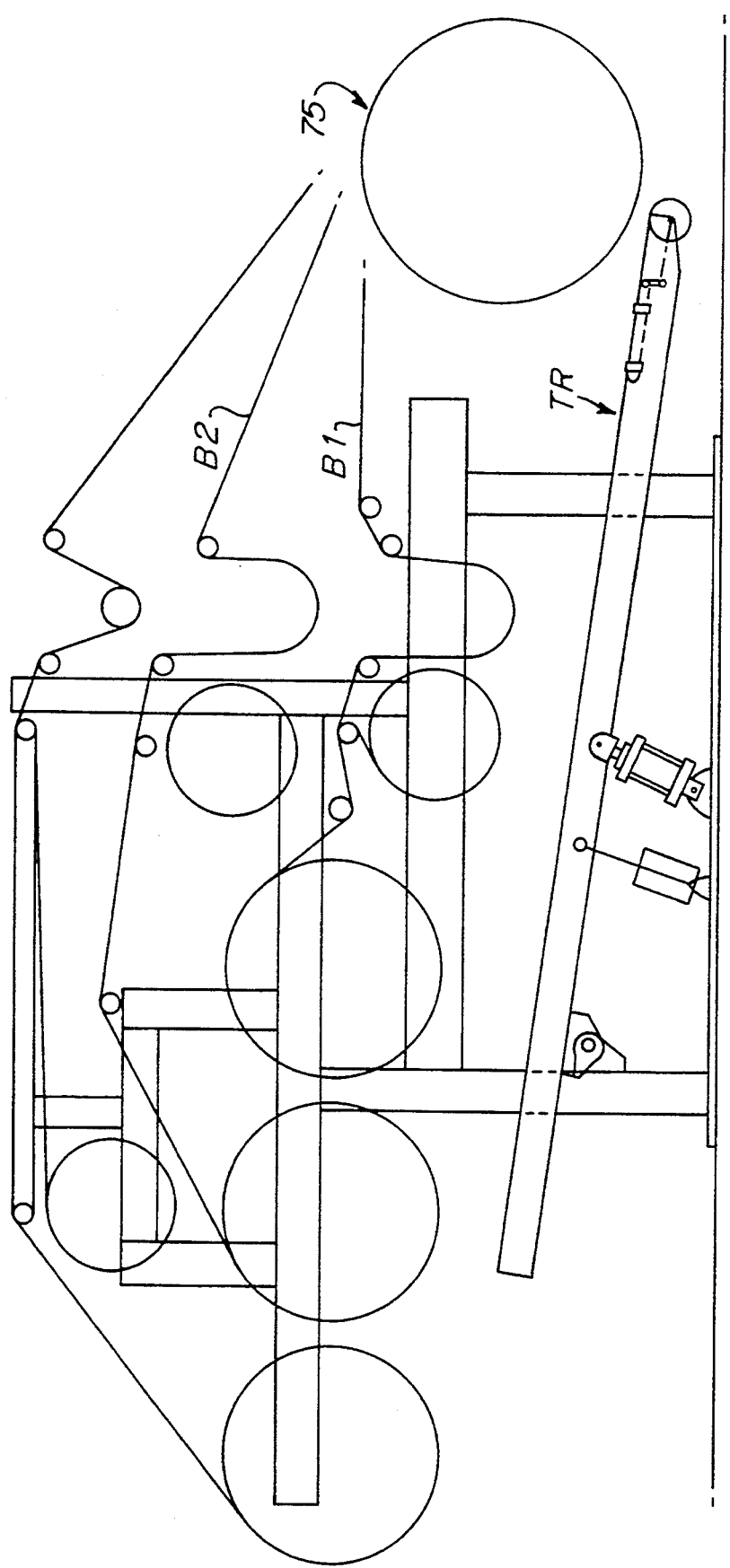
FIG. 6 is a schematic view of the belt and tread stock server for use in building the second stage assembly.

This unit (FIG. 6) is designed with belt and tread delivery being in line, meaning servicer shifting left to right and back for any reason during component application is not required. Servicer capability consists of storing and delivering two belts B1 and B2 and one tread component TR. Pay-out is powered by two D.C. motors which are dancer bar actuated. Supply rolls are kept from over-running by airpowered disk brakes. Air pressure is adjustable through a programmable valve and an ultrasonic roll diameter sensor which in combination successfully maintains equal drive-out tension.

Belt delivery to the building drum is achieved through precision belt pans. These advance for delivery to bring the guiders into the closest possible proximity with the belt/tread building drum 75, onto which belt components are to be placed. Each guider is individually adjustable left and right to assure positive centering with respect to the belt/tread drum. Each guider can also be tilted to allow compensating for uneven floors or other disturbing relationships between tire machine and servicer. The guider, once set, will concentrically deliver belts in range from 4¾ inch minimum to 11 inch maximum.

Both belt positions are also equipped with a foot pedal-initiated, automatic retract function. Retract can be "inched" by stepping on and releasing a designated foot switch; retract can also be activated to take a belt back to a predetermined position each time by holding the foot pedal. In that case, retract "stop" is sensed by a reflective scanner which signals that belt edge has passed a predetermined belt stop point which deactivates the belt retract function. The two reflective scanners interact directly with the control system giving a signal to the retract motor and the activating air cylinder.

Tread application on this building system works on the reverse principle. Treads are placed by a builder/operator, or a utility person, upside down into the tread delivery pan and urged downwardly forward through the guider against the stop roll. Tread application is from here on automatic through foot pedal actuation. The stop roll becomes a stitcher roll during the tread application in that it stitches the tread to the previously applied belt package. Details of this tread feeding operation are given in U.S. Pat. No. 4,820,373 of Apr. 11, 1989.

TIRE ASSEMBLY DRUM

Figure 8A:
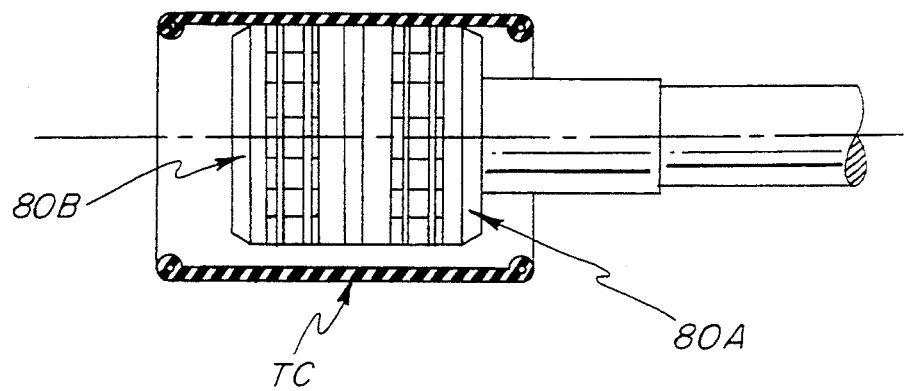
FIGS. 8A, 8B and 8C are progressive views of the tire assembly drum acting on the carcass to register it on the drum and to transform it to the desired toroidal shape.
Figure 8B:
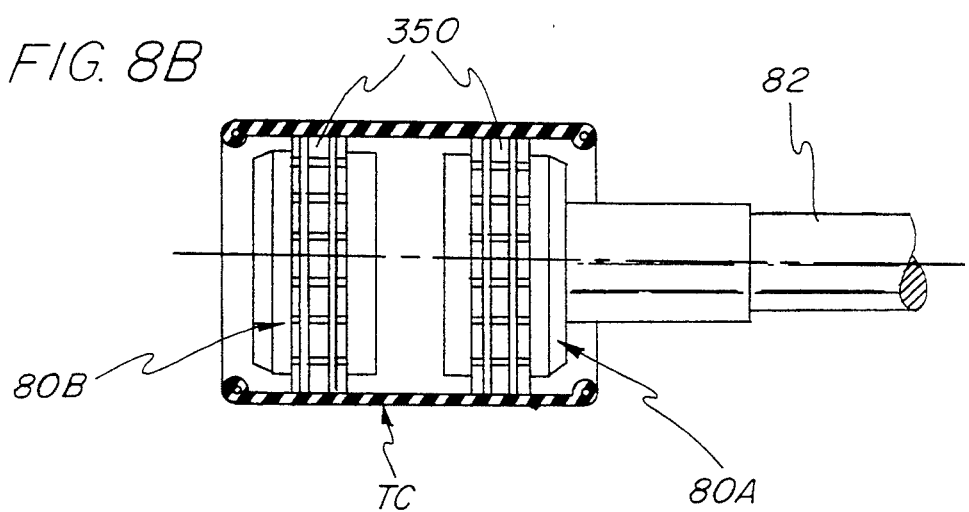
Figure 8C:
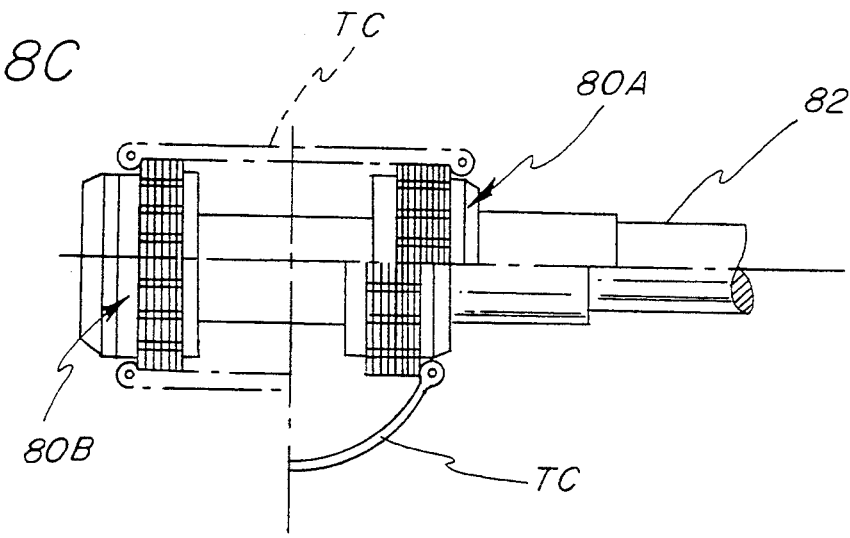

The tire assembly drum 80 (FIGS. 8 and 9) is a novel design with improvements over an earlier version of such a drum which is disclosed in aforementioned U.S. Pat. No. 4,402,782. Important features of drum 80 are that it presents an essentially smooth cylindrical surface, and that it includes a self-centering feature which automatically centers the first stage carcass TC thereon, and then seals the bead areas to the drum for subsequent internal pressurization as part of the conversion of the carcass into toroidal shape. The building drum 80 is made of two half parts 80A and 80B which are generally symmetrical and rotatably mounted on a tubular supporting shaft 82 which is fixed at one end to headstock structure and drive 340, as shown in FIGS. 1 and 8. Drum part 80A is rotatably supported around shaft 82 and drum part 80B is rotatably supported from the end of a coaxial inner control shaft, thus the two drum parts are freely rotatable on shaft 82 and also can be moved along their common axis to form a drum of variable length; compare FIGS. 8A and 8C. Details of the support and drive for these functions are disclosed in said U.S. Pat. No. 4,402,782, particularly in FIGS. 15-17 and related description.

Each half 80A and 80B includes a) a plurality of radially extensible locator pads 350 which are located in, and retractable into, a circumferential groove within the cylindrical surface of the drum halves 80A and 80B, and b) outboard thereof a radially extensible continuous seal ring 360 which is located within groove 352, outboard of pads 350, and is capable of making an essentially air-tight seal with at least one side of that groove. Internal passages are provided in each drum part for directing air under pressure into separate annular bladders beneath pads 350 and beneath seal rings 360, respectively, under control of suitable remotely actuated valves (not shown).

The shafts are supported in headstock 340, which also includes servomotor connected to rotate a threaded rod 380 (within shaft 82). The motion of drum halves 80A and 80B is controlled by reversibly driving rod 380, which has a first threaded portion nearest to the supporting end of shaft 82, and a second oppositely threaded portion 384 extending almost to the end of shaft 82. Rod 380 is rotatably supported at the headstock end of shaft 82 by a conventional bearing assembly and has a drive gear (not shown) keyed to its end for rotation by motor.

Control shaft has a rear follower nut (not shown) bolted to it and engaged with the first threaded portion of rod 380, near the headstock. A forward follower nut is engaged with the second or outermost threaded end of rod, and has a radially extending lug 382 bolted to the front of sleeve, and extending through an elongated slot 387 in mounting shaft 82 and through an even longer slot in the inner shaft. Thus, lug 382 will slide along slot 387 when rod 380 is rotated and the follower nuts move along the rod. This keeps sleeves and shaft from rotating yet allows their respective outer ends to move in opposite directions, toward or away from each other depending on the direction of rotation imparted to rod 380 by its drive.

Figure 9A:
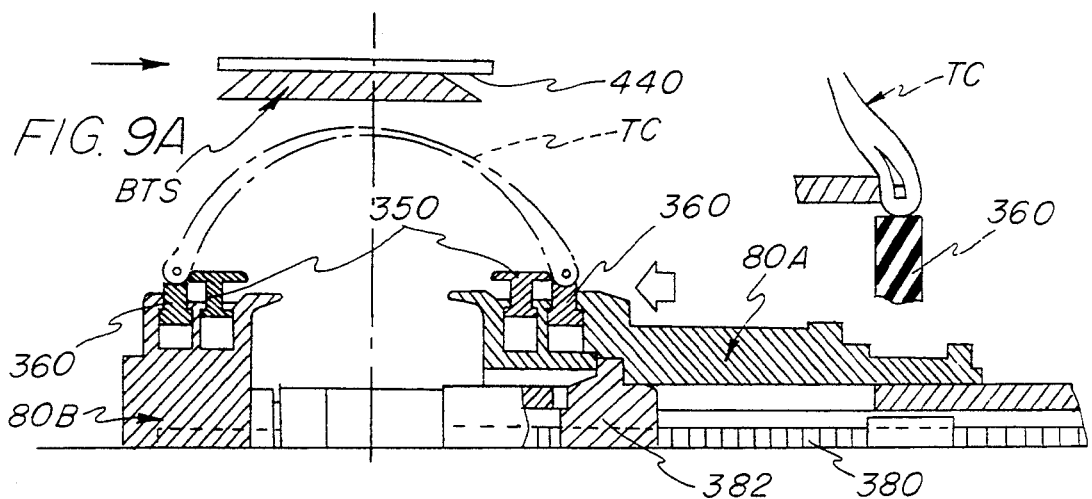
FIGS. 9A–9D are sequential views of the action of the tire assembly operation bringing together the first stage carcass and the second stage belt/tread stock assembly.
Figure 9B:
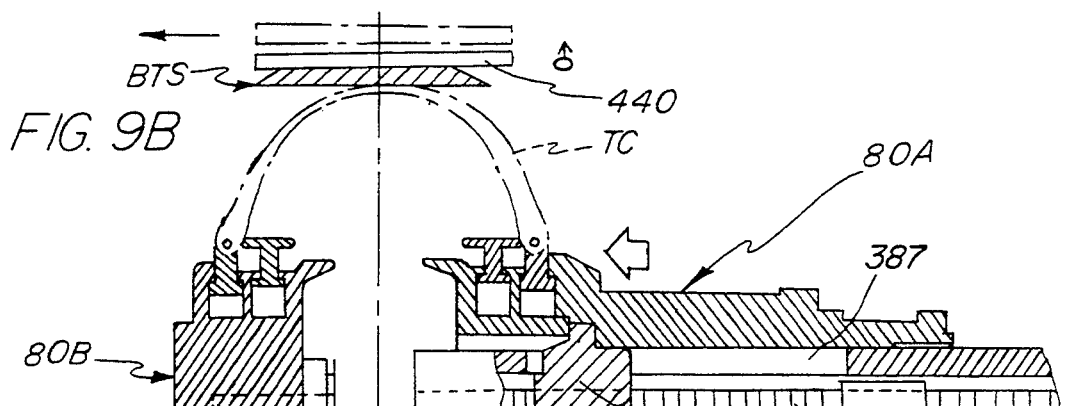
Figure 9C:
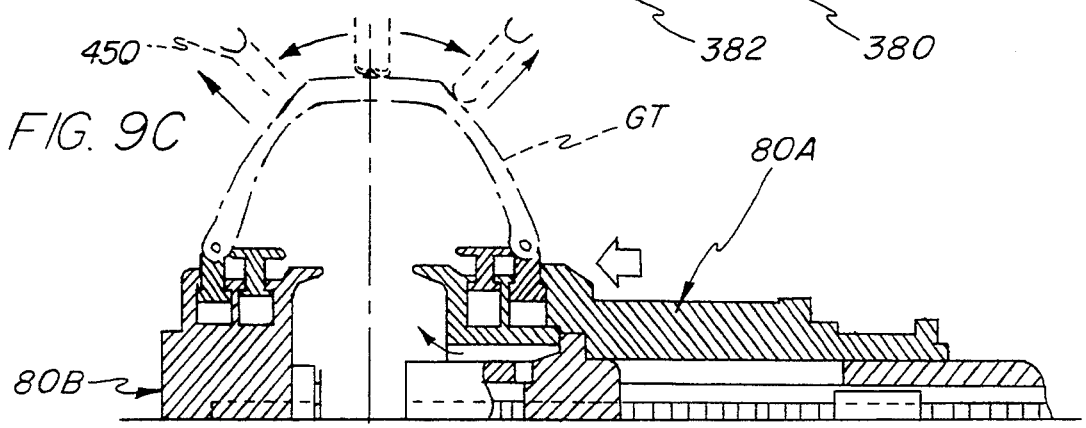
Figure 9D:
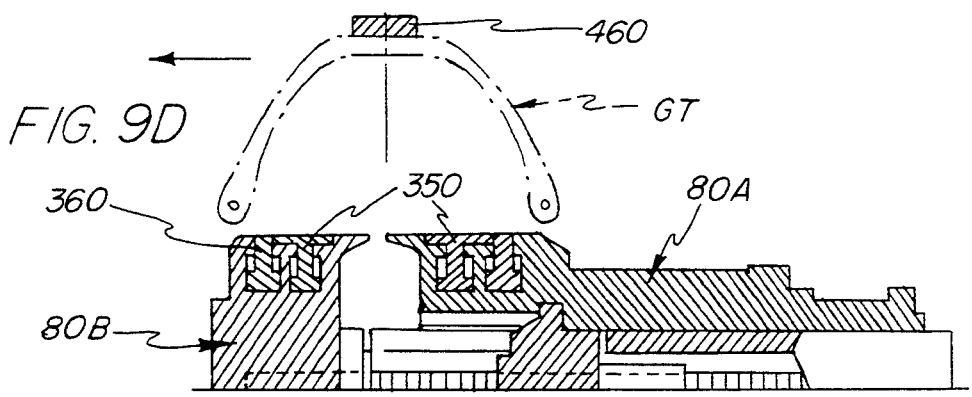
Figure 10:
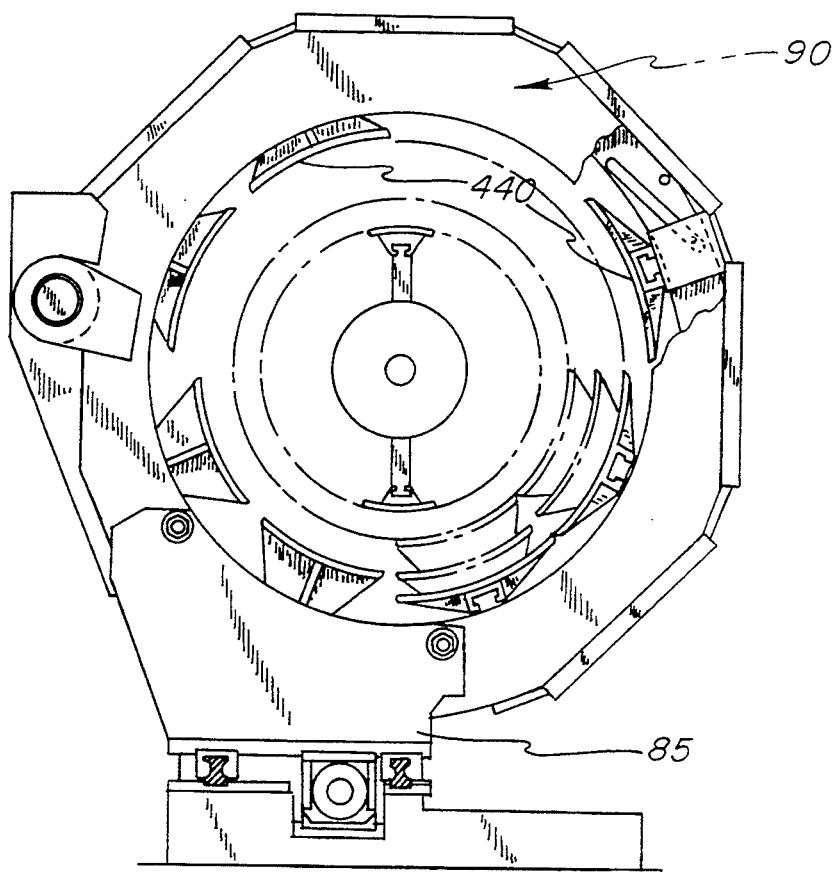
FIG. 10 is a view of the automated transfer ring for the second stage assembly.
Figure 11:
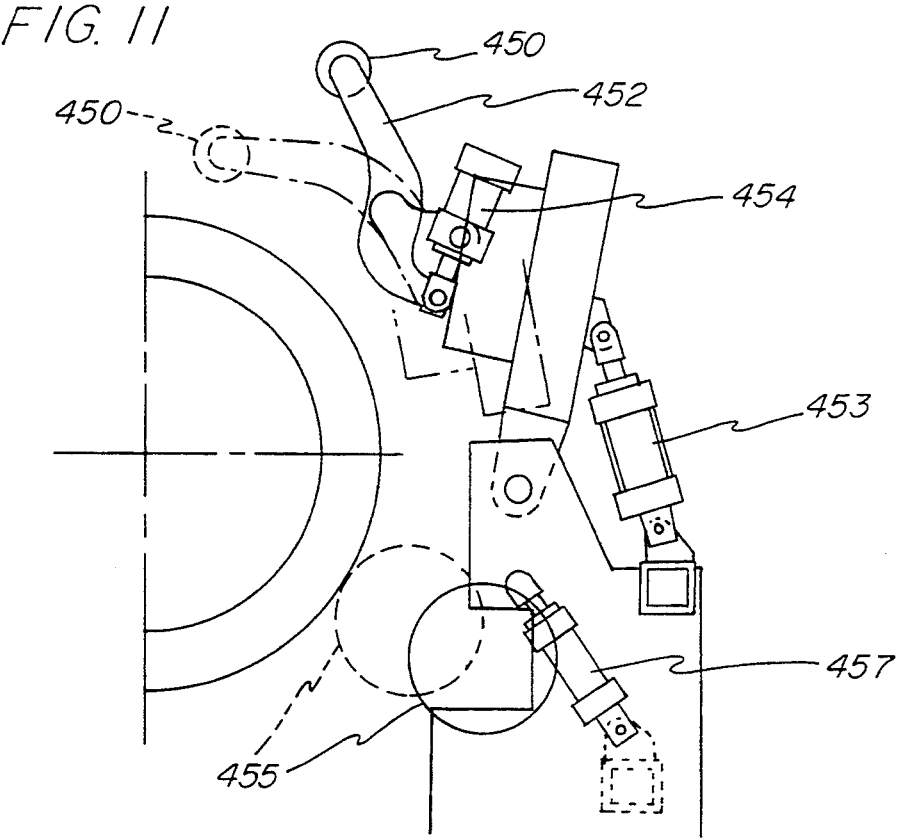
FIG. 11 is a schematic view of the final stitching operation.

After a first stage carcass is transferred onto the tire building drum halves 80A, 80B, pads 350 are extended by air pressure applied to bladders and the two halves of the drum are moved apart by rotating rod 380 in an appropriate direction. This causes the pads eventually to engage behind the beads of the carcass as can be seen from FIGS. 9A and 9B, and to move the carcass appropriately until the drum halves are engaged behind the corresponding bead, as shown in FIG. 9A. Then air pressure expands the bladders under seal rings 360 into a tight fit against the surfaces of the beads resting on the drum parts, forming an air-tight seal. Air under pressure is then supplied to the space between the drum halves 80A and 80B and the drum halves are moved together by rotating rod 380 in the opposite direction as this air pressure is increased. The action is described in further detail in U.S. Pat. No. 4,402,782. Thus the carcass is progressively shaped into a toroid, as shown in the sequence of FIGS. 9A and 9B.

The drum typically can accommodate a bead size range from 13 inches minimum to 16½ inches maximum, and a shoulder set range of 8½ inches minimum up to 24½ inches maximum has been designed into the drum. Shoulder set limits are programmable.

Belt/Tread Transfer Ring

The belt/tread assembly pick-up storage and delivery is achieved through chucking members and their radially inward/outward motions which are cam-controlled through the action of a servo motor along with a transverse drive positioner motor for the lateral positioning of the transfer ring relative to the belt/tread and assembly drum stations.

The transfer ring assembly 85 operates along bed 70 and its traversing drive is a ball screw/nut arrangement powered by servo motor. The chucking range for belt/tread assemblies extends from 21.9 inches minimum to 32.5 inches maximum. Three sets of eight each transfer ring segments cover the complete chucking range. Details of the transfer ring are disclosed in said U.S. Pat. No. 4,402,782.

Tire Driver Stitcher

Since no torque is transmitted through the assembly drum shaft, the green tire being assembled thereon must be rotated through external drive means. The machine is equipped with a driver which is adapted to rotate the tire through the engagement of a suitable drive wheel at the tread centerline while simultaneously consolidating this area, generally as disclosed in FIGS. 15 and 19 of said U.S. Pat. No. 4,402,782. During tire rotation, a pair of dynamic stitcher arms engage the tread portion of the tire for purpose of consolidating the belt/tread assembly from the center on outward toward the shoulders. Tire and stitcher rotational speeds are variable through programming of the unit's servomotor drive STDM.

Green Tire Unloader

Figure 12:
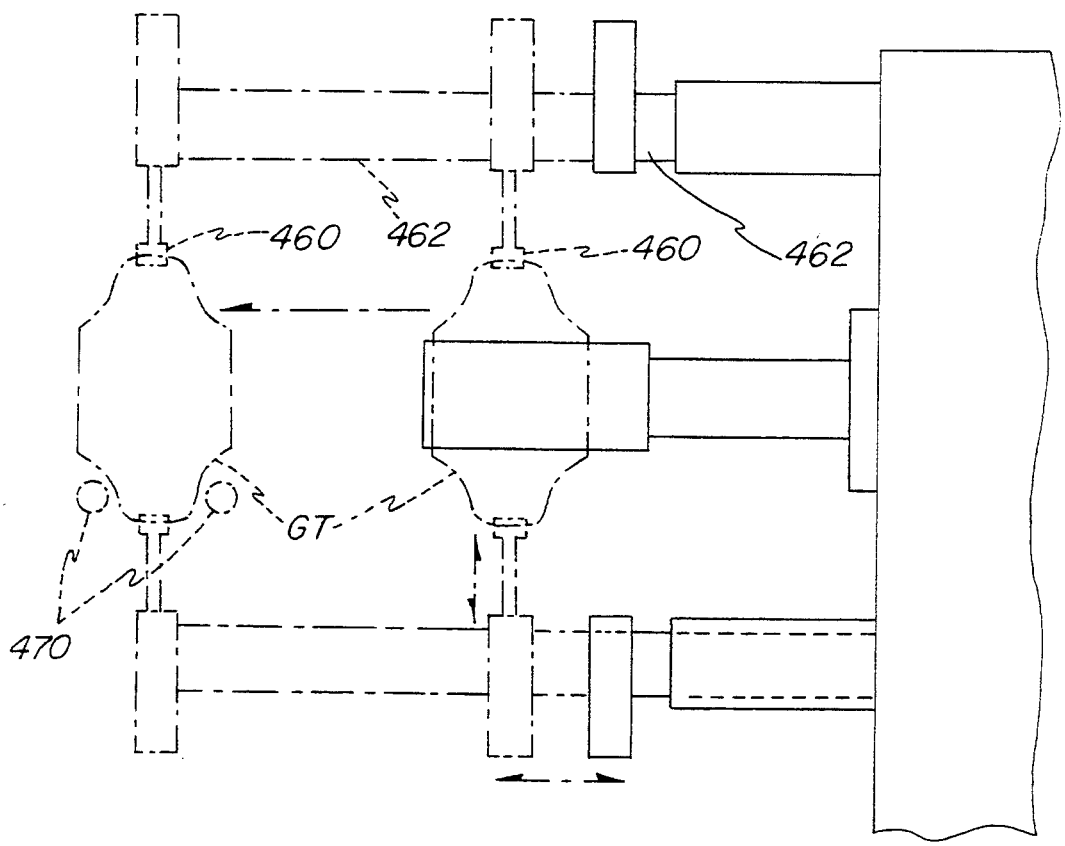
FIGS. 12 and 13 are schematic views showing the automatic unloading of a completed green tire.
Figure 13:
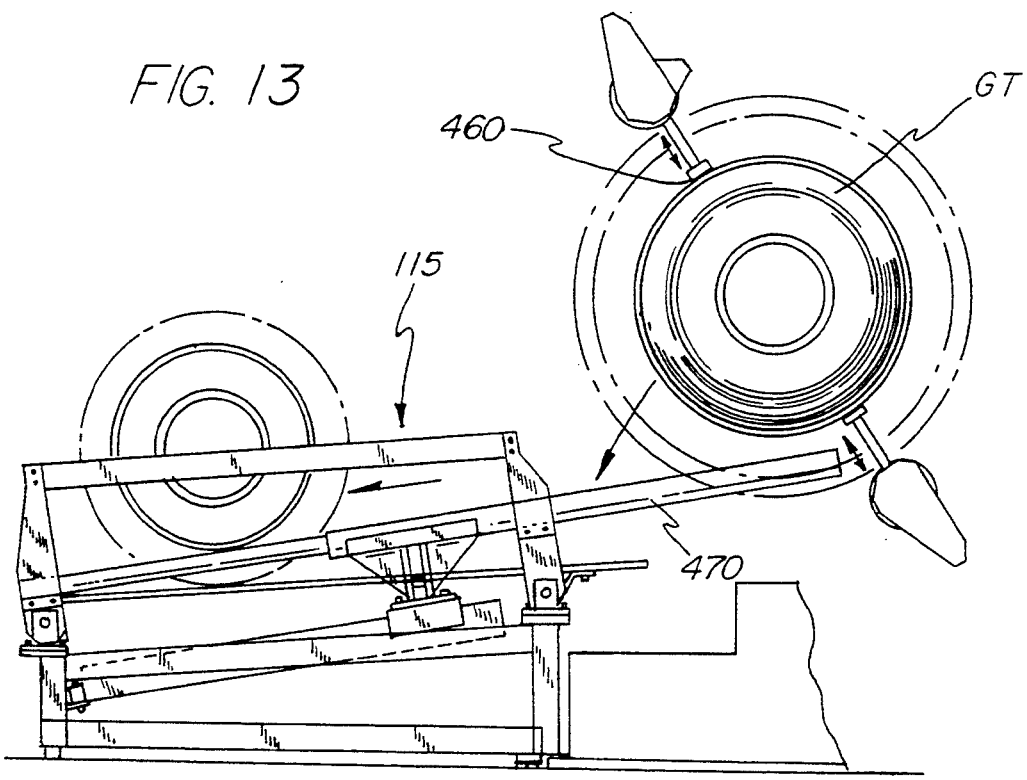

The second stage portion of the system embodies a pair of transfer arms 462 carrying radially movable grippers or pads 460 that are designed to engage the finished green tire GT at two points, hold it there until the inflation pressure has been released and then move the tire into the unload/discharge area. This action is illustrated in FIGS. 12 and 13, and the motion of arms 462 is under control of a servomotor. Once in that position, a pair of outwardly and downwardly inclined unloading rails 470 are moved forward and under the green tire GT to engage the tire after same has been released by the two grippers.

Due to its own gravity and the general design of the arrangement, the green tire when dropped onto the two extended unloading rails 470 induce the green tire to roll downwardly and away from the machine preferably onto a main stream conveyor.

Programmable Control

Figure 14A:
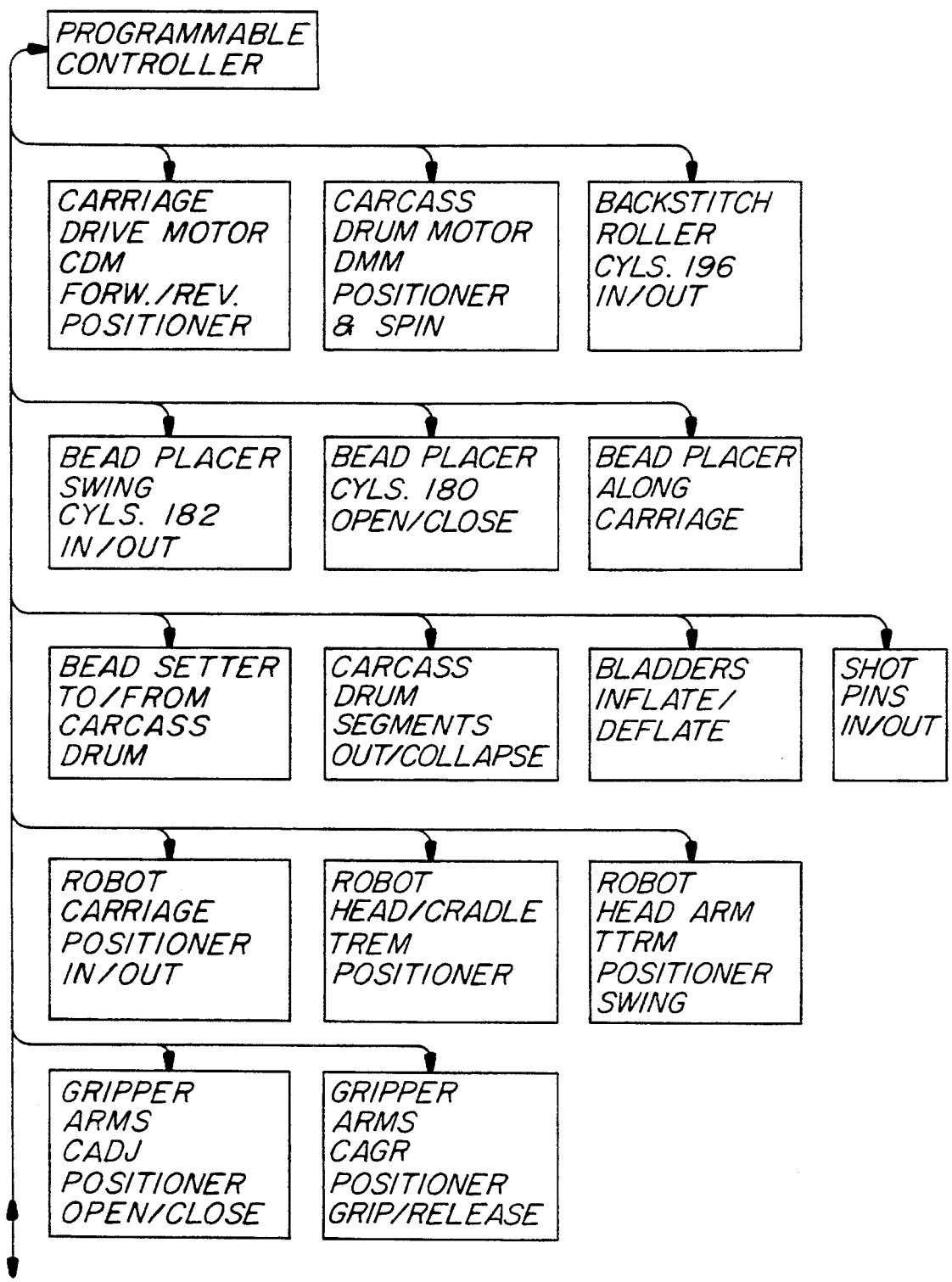
FIG. 14 (three sheets) is a block diagram of the system control.
Figure 14B:
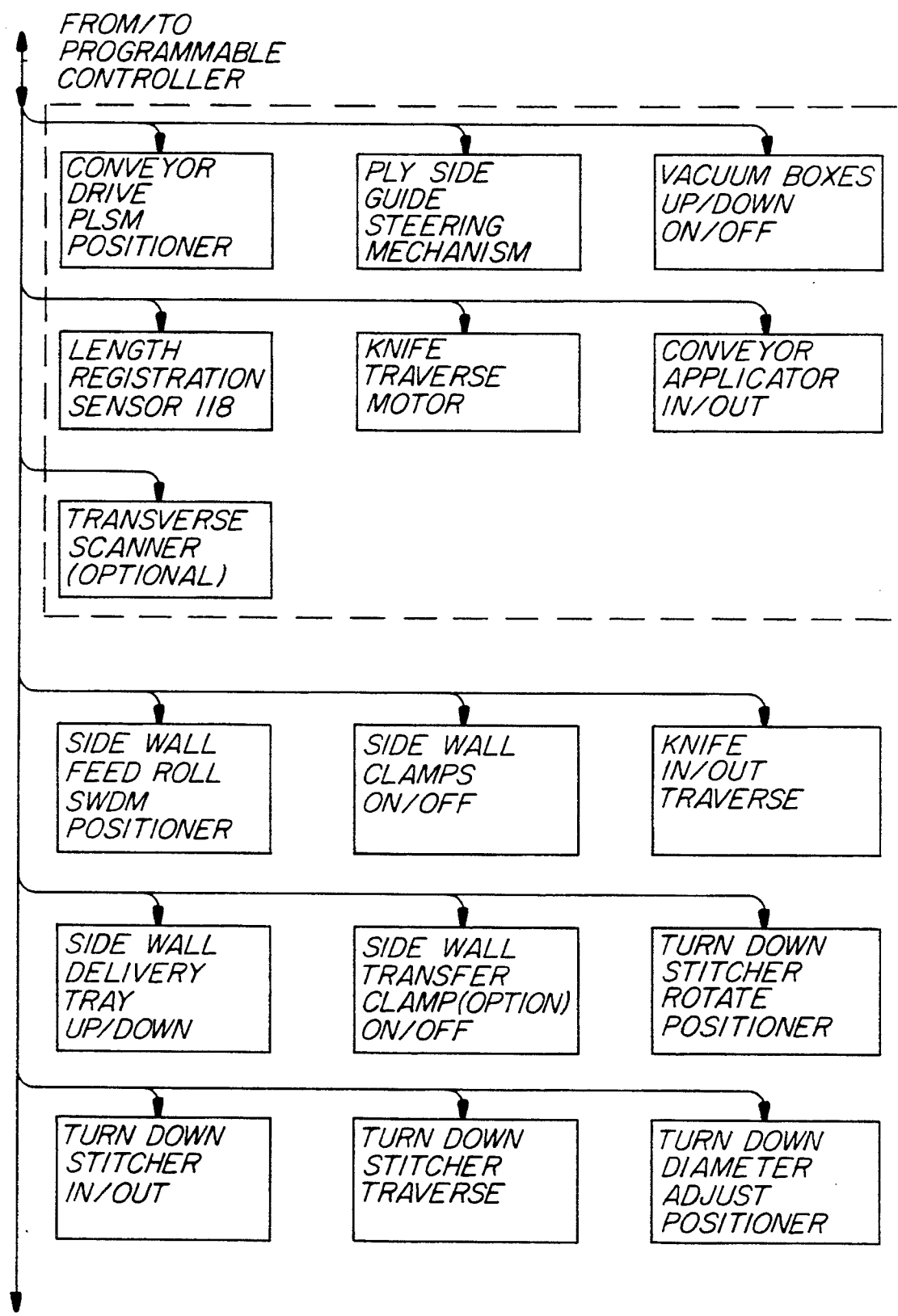
Figure 14C:
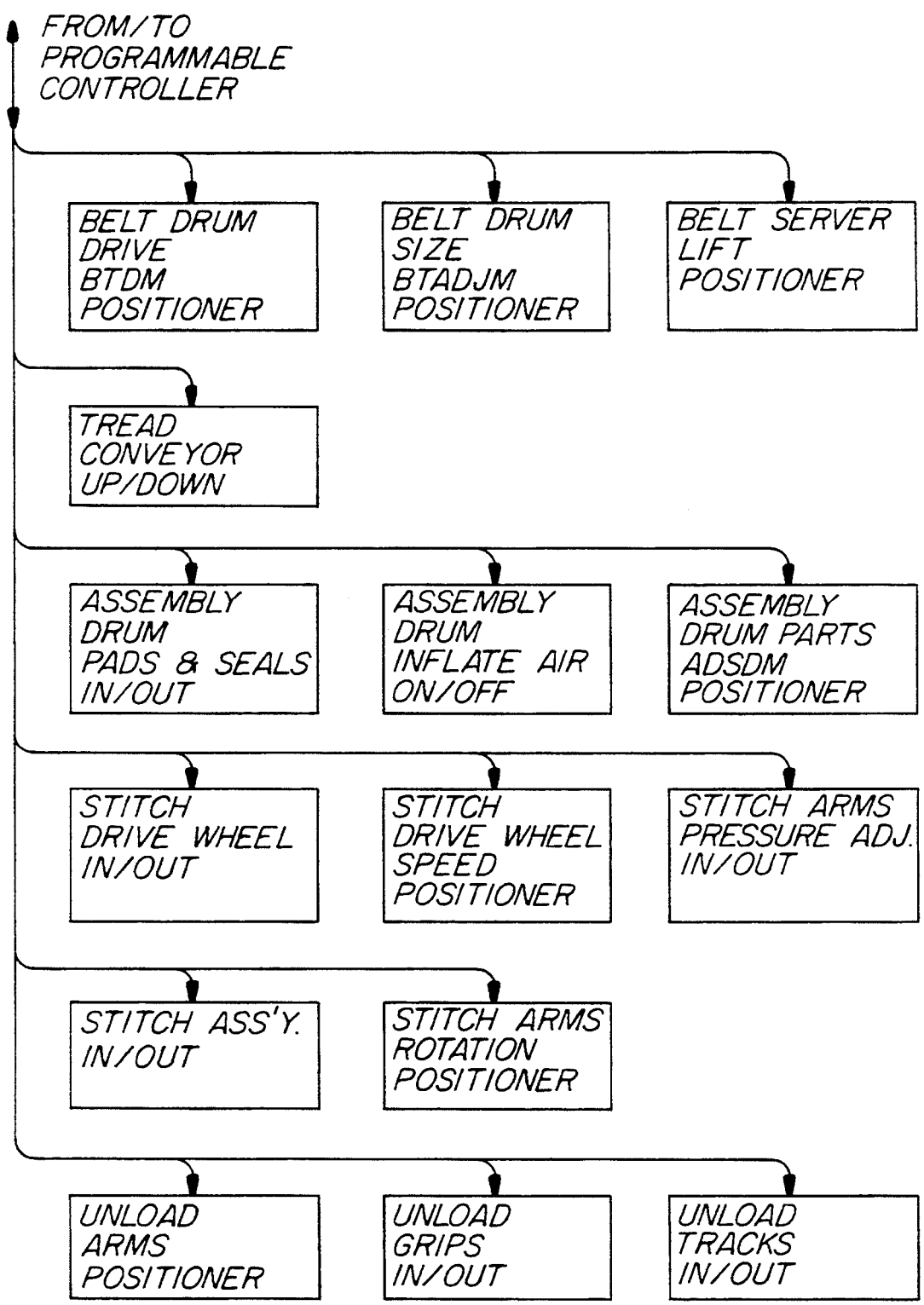

A suitable programmable control for the system is illustrated, in block form with explanatory legends, in FIG. 14. The programmable controller can be of any suitable type, and it controls the various components of the system primarily through conventional servomotor positioners which drive various units as described above. Thus, the action of any servomotor can be adjusted for discrete stepping, rotation through specified partial or complete revolutions, or running at programmed speeds.

While an operator is working at the belt-tread drum station, using the described controls to withdraw belt components and to rotate drum 75 as he adds the belts onto that drum, the automated tire carcass (first stage) apparatus initiates by moving the carriage to the first station A (innerliner), where the innerliner or first ply is in ready position. The carriage overruns this location and reverses, thus causing the headstock to close upon the tailstock and allow the shot pins to engage. Beads have already been loaded into the placers by the operator just after unloading of the previously made carcass. As the carriage 55 is driven by its motor CDM, the bead placers move inward to positions coaxial with the carcass drum, and then move along the carriage toward the bead setters at opposite ends of the drum. The beads are transferred, and this is signalled by detectors in the placers and bead setters.

After reversal, the servomotor CDM moves carriage 55 into position at station A. Once that motion stops, the applicator head for the ply conveyor at station A comes forward, engages the innerliner with the drum surface, and the drum is rotated to draw the innerliner onto and around the drum surface. The applicator head is withdrawn, and the carriage begins moving to station B. During this time, drum 60 may be rotated and the roll 195 pressed against the innerliner to smooth it.

A ply server stations B and C, the foregoing process is repeated, it being understood that only one of them might be active in a given specification, in which case the carriage motor simply passes by the disabled station. At least some of the plies are longer (lengthwise of the drum 60) than the drum surface. The extended parts of the plies are supported by partially inflating the bladders, which can rotate with the drum and effectively act as longitudinal extensions of its building surface for a time.

Figure 3:
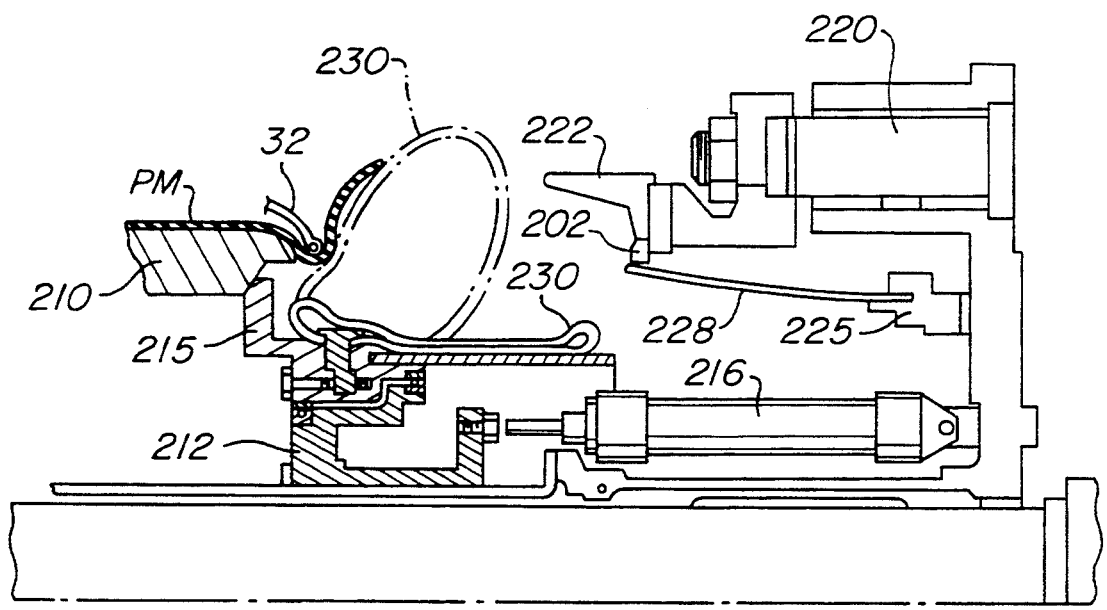
FIG. 3 is a view, principally in cross-section, showing a portion of the carcass building drum and its equipment.

Before the last ply station, the bead setters are actuated, and transfer the beads onto the ends of the plies already on the drum (see FIG. 3). The bladders are deflated and kept below the ply ends during this operation. Then, the bladders are expanded and guided (pushed) against the now up-turning ply ends, folding those ends over the beads. All these actions may occur during excursion of the carriage toward the last ply station C.

At the final ply station, the last ply is laid over and around the overturned previous ply ends. Then as the carriage moves outward the side wall server D, the drum 60 is rotated and the roller 195 actuated, to smooth the several layers of ply material. The carriage stops in precise alignment with the side wall strip server, and the strips, already measured in length and in a ready position adjacent to drum path, are "started" onto the drum 60. This may be done manually or by transfer/delivery mechanism, as explained earlier. Once the side wall strips are placed, roller 195 again is actuated while the drum is rotated, to stitch the strips to the exterior of the carcass. Then, the turn down rollers (at the base of the server D) are actuated and press against the end portions of the carcass, and travel around the embedded bead area, to consolidate and stitch these parts. When this action is finished, the robot head (cradle) commences motion toward the drum 60, and engages the fingers on arms 315 to the bead areas, closing in on them from the ends of the carcass. Once the carcass is grasped, drum 60 collapses, the shot pins 207 are released to free the carriage tailstock, and the carriage 55 moves in reverse, toward the ply server stations, sufficiently to withdraw drum 60 from within the finished carcass TC.

The robot next swings the carcass over in front of the tire assembly drum 80 and then moves backward from its unloading extended position, carrying the carcass around drum 80 and stopping when the carcass rests on both drum parts (FIG. 8A). The arms 315 then move apart (lengthwise of the carcass, to release, and the robot head swings upward to its parked position.

In the meantime, another set of beads has been loaded into the placers, and the carriage 55 has started back to the first ply server A.

In the time the carcass building is taking place, the belt-tread construction has been completed, and transfer ring picks up the completed second stage assembly, with the drum 75 collapsing under programmable control to free the assembly after the shoes of the transfer ring 85 have engaged the periphery of that assembly. The transfer ring 85 then is moved into location around the assembly drum 80, as soon as the robot has loaded a carcass thereon.

Next, the carcass is partially inflated and transformed to toroidal shape, then inflated further and brought into contact with the second stage assembly in the surrounding transfer ring 85. The shoes of the transfer ring are then moved outward, and the ring moved to its park position, beyond the unloading station. The final stitcher comes into action, and stitches the two assemblies together, as explained earlier.

Finally, the stitcher mechanism is withdrawn, the unloading arms and grips come into action, remove the green tire from drum 80, carrying forward to where the tracks 470 have extended into the unloading station, and the green tire is released (dropped) on its periphery into these tracks, causing it to roll away. By this time, the operator is back at the belt-tread drum and servers, beginning a new second stage assembly.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. In a tire building system
   a carcass building drum,
   a carriage supporting said carcass building drum for rotation about its central axis,
   servo motor means on said carriage and connected to rotate said carcass building drum,
   means including a way defining a carcass building path and supporting said carriage for movement along the path,
   a plurality of programmable automatic carcass component servers arranged seriatim along one side of said way,
   each said server being adapted to deliver a tire carcass component to said drum,
   programmable carriage motor means for moving said carriage along said way and stopping said carriage successively in predetermined positions precisely aligned with components on said servers and to a carcass unloading position for automated sequential transfer of components from said servers onto said carcass building drum in a predetermined order, bead ring assembly placers supported on said carriage at the ends of said carcass building drum for holding and manipulating bead ring assemblies to be incorporated into a carcass, placer motor means for moving said placers toward the ends of said carcass building drum to set bead ring assemblies onto the ends of components overlapping the ends of said carcass building drum whereby a tire carcass of generally cylindrical shape and having inwardly extending bead areas at its ends is assembled and presented at the unloading position, and a programmable controller connected to control said carriage motor means, said placer motor means and said servers in sequential fashion to automatically construct a first stage tire carcass.

2. A system as defined in claim 1, further including carcass transfer mechanism including programmable drive motors for causing said mechanism to grasp a completed carcass on said carcass building drum at the carcass unloading position, means under control of said programmable controller for withdrawing said carcass building drum from a carcass grasped by said transfer mechanism, said transfer mechanism motors being controlled by said programmable controller to cycle through a transfer sequence in which said transfer mechanism removes a completed carcass away from said carriage.

3. A system as defined in claim 2, including a tire assembly drum located adjacent said transfer mechanism and spaced from the carcass unloading position, said programmable controller actuating said transfer mechanism motors to load the completed carcass onto said tire assembly drum.

4. A system as defined in claim 3, including radially expandable means on said tire assembly drum and operated under control of said programmable controller for engaging the interior of a carcass placed thereon and sealing to the bead areas of the carcass, transforming means operated by said programmable controller for introducing pressurized air into the interior of the sealed carcass and for moving the bead areas of the carcass toward each other to shape the carcass generally into a toroid once the carcass is secured and sealed to said tire assembly drum.

5. The system defined in claim 4, further comprising means for building a belt-tread assembly including a belt-tread building drum supported in alignment with said tire assembly drum, a transfer ring having a plurality of radially movable interior shoes for grasping a belt-tread assembly on said belt-tread building drum, size control servomotor means for moving said shoes of said transfer ring, a track supporting said transfer ring for movement between a pick-up station at said belt-tread building drum and a delivery station at said tire assembly drum, transport motor means for moving said transfer ring along said track between said pick-up and delivery stations, said programmable controller being connected to said size control servomotor means and to said ring transport motor means to cause said transfer ring to remove a belt-tread assembly from said belt-tread building drum and carry said assembly to said delivery station surrounding a carcass on said tire assembly drum.

6. A system as defined in claim 1, wherein said component servers include at least one server assembly for applying ply material from a continuous source of ply material onto said carcass building drum, the continuous source of ply material being in the form of a continuous supply roll, the server assembly comprising:

an endless conveyor belt, feeding means for feeding the ply material from the source onto said conveyor belt, knife means for cutting the ply material resting on said conveyor belt, conveyor drive means controlled by said programmable controller for advancing said conveyor belt toward a ply delivery station at which said carcass building drum is aligned with a length of ply material on said conveyor belt, timed operation of said conveyor drive means determining the length of ply material carried past said knife means, applicator means operated by said programmable controller for moving said conveyor belt against said carcass building drum to bring the length of ply material on said belt into contact with said carcass building drum.

7. A tire building system as defined in claim 1, further including power operated stitching means controlled by said programmable controller for stitching the carcass components together on said carcass building drum after all components are assembled thereon.

8. A tire building system as defined in claim 1, further comprising said carriage including a headstock and a tailstock thereon providing support for said carcass building drum and power operated mean controlled by said programmable controller for displacing said tailstock from said carriage to allow said carriage building drum to be held temporarily in cantilever fashion by said headstock, a pair of bead ring assembly placer rings supported by said carriage, one adjacent each end of said drum, and controlled by said programmable controller for receiving a bead ring assembly and cooperating with said carcass building drum to move the bead ring assemblies automatically into coaxial alignment with said drum when said tailstock is displaced from said carriage and then to load the bead ring assembly onto said bead ring assembly placers.

9. A tire carcass building machine as defined in claim 1, further comprising means for folding the edge portions of carcass components overlapping the ends of said carcass building drum, said folding means including a pair of selectively inflatable turn-over bladders rotatably supported one adjacent each end of said drum, means for supplying air under pressure into said bladders under control of said programmable controller during placement of carcass components on said drum to support carcass component edge portions extending beyond the ends of said drum, means for deflating said bladders under control of said programmable controller prior to supplying bead ring assemblies to the opposite ends of said drum, means for deflecting the component edge portions inward toward the deflated bladders under control of said programmable controller as said placer means set bead ring assemblies around the deflected component edge portions, and means for supplying air to re-inflate said bladders and means for guiding the re-inflated bladders over and around the bead ring assemblies, under control of said programmable controller, to enclose such assemblies inside the component edge portions.

10. A tire building system as defined in claim 1, further comprising a stitcher roller approximately equal in length to said carcass building drum, means supporting said stitcher roller on said carriage spaced from said carcass building drum, the axes of said roller and said drum being parallel, and means for moving said stitcher roller into contact with carcass components on said drum under control of said programmable controller while said drum is rotated to smooth the components and stitch them to each other.

* * * * *